(12) United States Patent
Bojkova

(10) Patent No.: US 7,687,597 B2
(45) Date of Patent: *Mar. 30, 2010

(54) THIOETHER FUNCTIONAL OLIGOMERIC POLYTHIOLS AND ARTICLES PREPARED THEREFROM

(75) Inventor: Nina V. Bojkova, Monroeville, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 271 days.

This patent is subject to a terminal disclaimer.

(21) Appl. No.: 11/744,247

(22) Filed: May 4, 2007

(65) Prior Publication Data
US 2008/0125525 A1 May 29, 2008

Related U.S. Application Data

(60) Provisional application No. 60/797,985, filed on May 5, 2006.

(51) Int. Cl.
*C08G 75/04* (2006.01)
(52) U.S. Cl. .................. 528/374; 524/114; 524/81; 524/196; 528/373; 528/383
(58) Field of Classification Search .................. 528/374
See application file for complete search history.

(56) References Cited

U.S. PATENT DOCUMENTS

| | | | |
|---|---|---|---|
| 2,370,567 A | 2/1945 | Muskat et al. |
| 2,403,113 A | 7/1946 | Muskat et al. |
| 2,644,007 A | 6/1953 | Irwin |
| 2,680,127 A | 6/1954 | Slocombe et al. |
| 2,908,703 A | 10/1959 | Latourette et al. |
| 2,965,650 A | 12/1960 | Howard, Jr. |
| 2,965,651 A | 12/1960 | Kosmin |
| 3,169,945 A | 2/1965 | Hostettler et al. |
| 3,361,706 A | 1/1968 | Meriwether et al. |
| 3,562,172 A | 2/1971 | Ono et al. |
| 3,567,605 A | 3/1971 | Becker |
| 3,578,602 A | 5/1971 | Ono et al. |
| 3,592,798 A | 7/1971 | Oswald |
| 3,647,852 A * | 3/1972 | Kamal et al. ............ 260/463 |
| 3,714,290 A | 1/1973 | Kehr et al. |
| 3,717,618 A | 2/1973 | Oswald |
| 3,725,229 A | 4/1973 | Kehr et al. |
| 3,729,403 A | 4/1973 | Kehr et al. |
| 3,766,148 A | 10/1973 | Taub |
| 3,866,242 A | 2/1975 | Slagel |
| 3,872,150 A | 3/1975 | Kehr et al. |
| 3,872,151 A | 3/1975 | Kehr et al. |
| 3,872,152 A | 3/1975 | Kehr et al. |
| 3,898,349 A | 8/1975 | Kehr et al. |
| 3,931,287 A | 1/1976 | Kehr et al. |
| 3,954,723 A | 5/1976 | Oswald |
| 3,971,892 A | 7/1976 | Schlichte |
| 4,059,570 A | 11/1977 | Oswald |
| 4,095,637 A | 6/1978 | Krishnan |
| 4,153,777 A | 5/1979 | Slagel |
| 4,160,853 A | 7/1979 | Ammons |
| 4,166,043 A | 8/1979 | Uhlmann et al. |
| 4,208,507 A | 6/1980 | Stutz et al. |
| 4,215,010 A | 7/1980 | Hovey et al. |
| 4,342,668 A | 8/1982 | Hovey et al. |
| 4,365,051 A | 12/1982 | Chung et al. |
| 4,367,170 A | 1/1983 | Uhlmann et al. |
| 4,556,605 A | 12/1985 | Mogami et al. |
| 4,581,433 A | 4/1986 | Potter et al. |
| 4,637,698 A | 1/1987 | Kwak et al. |
| 4,719,296 A | 1/1988 | Irie et al. |
| 4,720,356 A | 1/1988 | Chu |
| 4,731,264 A | 3/1988 | Lin et al. |
| 4,756,973 A | 7/1988 | Sakagami et al. |
| 4,764,430 A | 8/1988 | Blackburn et al. |
| 4,798,745 A | 1/1989 | Martz et al. |
| 4,798,746 A | 1/1989 | Claar et al. |
| 4,808,690 A | 2/1989 | Slagel |
| 4,810,812 A | 3/1989 | Matsuda et al. |
| 4,816,584 A | 3/1989 | Kwak et al. |
| 4,818,096 A | 4/1989 | Heller et al. |
| 4,826,977 A | 5/1989 | Heller et al. |
| 4,856,857 A | 8/1989 | Takeuchi et al. |
| 4,866,103 A | 9/1989 | Cassidy et al. |
| 4,873,027 A | 10/1989 | Umemoto et al. |
| 4,880,667 A | 11/1989 | Welch et al. |
| 4,889,413 A | 12/1989 | Ormsby et al. |
| 4,892,920 A | 1/1990 | Quay et al. |
| 4,904,525 A | 2/1990 | Taniguchi et al. |

(Continued)

FOREIGN PATENT DOCUMENTS

DE 116520 11/1975

(Continued)

*Primary Examiner*—Randy Gulakowski
*Assistant Examiner*—Shane Fang
(74) *Attorney, Agent, or Firm*—Deborah M. Altman

(57) ABSTRACT

Provided is a thioether-functional, oligomeric polythiol having pendant hydroxyl functional groups, prepared by reacting together: (a) a compound having at least two thiol functional groups; and (b) a hydroxyl functional compound having triple bond functionality. Also provided are optical articles prepared from the reaction product of: (A) a reactive compound having functional groups that are reactive with active hydrogens; (B) a thioether-functional, oligomeric polythiol; and, optionally, (C) a compound different from (B) containing active hydrogens.

14 Claims, No Drawings

U.S. PATENT DOCUMENTS

| | | | |
|---|---|---|---|
| 4,931,219 A | 6/1990 | Kwiatkowski et al. |
| 4,931,220 A | 6/1990 | Haynes et al. |
| 5,066,818 A | 11/1991 | Gemert et al. |
| 5,071,951 A | 12/1991 | Ulrich et al. |
| 5,104,692 A | 4/1992 | Belmares |
| 5,134,191 A | 7/1992 | Takarada et al. |
| 5,158,922 A | 10/1992 | Hinney et al. |
| 5,166,345 A | 11/1992 | Akashi et al. |
| 5,196,485 A | 3/1993 | McMonigal et al. |
| 5,225,472 A | 7/1993 | Cameron et al. |
| 5,231,156 A | 7/1993 | Lin |
| 5,236,958 A | 8/1993 | Miyashita |
| 5,236,978 A | 8/1993 | Selvig et al. |
| 5,238,931 A | 8/1993 | Yoshikawa et al. |
| 5,239,012 A | 8/1993 | McEntire et al. |
| 5,252,742 A | 10/1993 | Miyashita |
| 5,256,452 A | 10/1993 | McMonigal |
| 5,274,132 A | 12/1993 | Van Gemert |
| 5,310,577 A | 5/1994 | Mase et al. |
| 5,323,191 A | 6/1994 | Firtion et al. |
| 5,352,758 A | 10/1994 | Kanemura et al. |
| 5,359,035 A | 10/1994 | Habermann |
| 5,359,085 A | 10/1994 | Iwamoto et al. |
| 5,373,033 A | 12/1994 | Toh et al. |
| 5,384,077 A | 1/1995 | Knowles |
| 5,384,379 A | 1/1995 | Bader et al. |
| 5,391,327 A | 2/1995 | Ligas et al. |
| 5,405,958 A | 4/1995 | Van Gemert |
| 5,429,774 A | 7/1995 | Kumar |
| 5,462,806 A | 10/1995 | Konishi et al. |
| 5,466,398 A | 11/1995 | Van Gemert et al. |
| 5,470,813 A | 11/1995 | Le-Khac |
| 5,482,908 A | 1/1996 | Le-Khac |
| 5,488,119 A | 1/1996 | Fischer-Reimann et al. |
| 5,496,641 A | 3/1996 | Mase et al. |
| 5,498,686 A | 3/1996 | Effer et al. |
| 5,552,091 A | 9/1996 | Kumar |
| 5,602,198 A | 2/1997 | Das et al. |
| 5,618,586 A | 4/1997 | Swarup et al. |
| 5,621,017 A | 4/1997 | Kobayakawa et al. |
| 5,631,339 A | 5/1997 | Faler et al. |
| 5,645,767 A | 7/1997 | Van Gemert |
| 5,646,230 A | 7/1997 | Pantone et al. |
| 5,658,501 A | 8/1997 | Kumar et al. |
| 5,663,244 A | 9/1997 | Barancyk et al. |
| 5,679,756 A | 10/1997 | Zhu et al. |
| 5,684,083 A | 11/1997 | Temple et al. |
| 5,693,738 A | 12/1997 | Okazaki et al. |
| 5,698,141 A | 12/1997 | Kumar |
| 5,739,243 A | 4/1998 | Herold et al. |
| 5,753,146 A | 5/1998 | Van Gemert et al. |
| 5,770,115 A | 6/1998 | Misura |
| 5,776,376 A | 7/1998 | Nagoh et al. |
| 5,807,975 A | 9/1998 | Amagai et al. |
| 5,811,503 A | 9/1998 | Herold et al. |
| 5,811,506 A | 9/1998 | Slagel |
| 5,814,410 A | 9/1998 | Singer et al. |
| 5,821,287 A | 10/1998 | Hu et al. |
| 5,830,578 A | 11/1998 | Ono et al. |
| 5,910,522 A | 6/1999 | Schmidt et al. |
| 5,917,006 A | 6/1999 | Smith et al. |
| 5,932,681 A | 8/1999 | Herold et al. |
| 5,942,158 A | 8/1999 | Okoroafor et al. |
| 5,945,504 A | 8/1999 | Amagi et al. |
| 5,961,889 A | 10/1999 | Jiang et al. |
| 5,962,617 A | 10/1999 | Slagel |
| 5,962,619 A | 10/1999 | Seneker et al. |
| 5,976,422 A | 11/1999 | Okoroafor et al. |
| 5,976,701 A | 11/1999 | Barancyk et al. |
| 6,025,026 A | 2/2000 | Smith et al. |
| 6,042,737 A | 3/2000 | Basil et al. |
| 6,060,001 A | 5/2000 | Welch et al. |
| 6,100,362 A | 8/2000 | Okazaki et al. |
| 6,113,814 A | 9/2000 | Van Gemert et al. |
| 6,127,505 A | 10/2000 | Slagel |
| 6,130,307 A | 10/2000 | Amagai et al. |
| 6,150,430 A | 11/2000 | Walters et al. |
| 6,153,126 A | 11/2000 | Kumar |
| 6,166,129 A | 12/2000 | Rosthauser et al. |
| 6,174,984 B1 | 1/2001 | Peter |
| 6,175,450 B1 | 1/2001 | Andreani et al. |
| 6,187,444 B1 | 2/2001 | Bowles, III et al. |
| 6,268,055 B1 | 7/2001 | Walters et al. |
| 6,296,785 B1 | 10/2001 | Nelson et al. |
| 6,342,571 B1 | 1/2002 | Smith et al. |
| 6,348,604 B1 | 2/2002 | Nelson et al. |
| 6,353,039 B1 | 3/2002 | Rheinberger et al. |
| 6,353,102 B1 | 3/2002 | Kumar |
| 6,432,526 B1 | 8/2002 | Arney |
| 6,432,544 B1 | 8/2002 | Stewart et al. |
| 6,433,043 B1 | 8/2002 | Misura et al. |
| 6,436,525 B1 | 8/2002 | Welch et al. |
| 6,441,119 B1 | 8/2002 | Kosaka |
| 6,472,495 B1 | 10/2002 | Yoshimura et al. |
| 6,506,488 B1 | 1/2003 | Stewart et al. |
| 6,509,418 B1 | 1/2003 | Zook et al. |
| 6,531,076 B2 | 3/2003 | Crano et al. |
| 6,555,028 B2 | 4/2003 | Walters et al. |
| 6,602,603 B2 | 8/2003 | Welch et al. |
| 6,631,021 B2 | 10/2003 | Smith et al. |
| 6,733,887 B2 | 5/2004 | Okoroafor et al. |
| 7,144,969 B2 | 12/2006 | McDonald |
| 7,169,375 B2 | 1/2007 | Chisholm |
| 2001/0047043 A1 | 11/2001 | Okoroafor et al. |
| 2003/0096935 A1 | 5/2003 | Nagpal et al. |
| 2003/0144452 A1 | 7/2003 | Jallouli et al. |
| 2003/0149217 A1 | 8/2003 | Bojkova et al. |
| 2004/0138401 A1 | 7/2004 | Bojkova et al. |
| 2006/0008596 A1 | 1/2006 | Pokorny et al. |

FOREIGN PATENT DOCUMENTS

| | | |
|---|---|---|
| DE | 3201224 C2 | 9/1989 |
| EP | 0 146 136 B1 | 5/1990 |
| EP | 0 454 066 A2 | 10/1991 |
| EP | 0 294 056 B1 | 4/1994 |
| EP | 0 329 387 B1 | 6/1994 |
| EP | 0 578 220 A2 | 12/1994 |
| EP | 0 802 208 A1 | 10/1997 |
| EP | 0 936 233 A2 | 8/1999 |
| EP | 1 099 721 A1 | 5/2001 |
| EP | 1 134 242 A2 | 9/2001 |
| EP | 1 211 276 A2 | 12/2001 |
| EP | 1 197 505 A1 | 4/2002 |
| EP | 0 927 730 B1 | 9/2003 |
| EP | 1 384 736 A1 | 1/2004 |
| FR | 2 751 763 A1 | 1/1988 |
| GB | 1215591 | 12/1970 |
| GB | 1 419 985 | 7/1976 |
| GB | 150 1801 | 2/1978 |
| JP | 62-226134 | 5/1987 |
| JP | 62-195383 | 8/1987 |
| JP | 63-178193 | 7/1988 |
| JP | 3-2864 | 1/1991 |
| JP | 3-35236 | 2/1991 |
| JP | 3-269507 | 2/1991 |
| JP | 5-28753 | 4/1993 |
| JP | 2000-256435 | 9/2000 |
| WO | WO 96/11926 | 4/1996 |
| WO | WO 96/18926 | 6/1996 |
| WO | WO 96/19741 | 6/1996 |
| WO | WO 96/37573 | 11/1996 |
| WO | WO 97/00910 | 1/1997 |
| WO | WO 97/03373 | 1/1997 |

| WO | WO 97/05213 | 2/1997 |
| WO | WO 97/06944 | 2/1997 |
| WO | WO 97/21122 | 6/1997 |
| WO | WO 98/37115 | 8/1998 |
| WO | WO 99/29791 | 6/1999 |
| WO | WO 00/14137 | 3/2000 |
| WO | WO 00/17249 | 3/2000 |
| WO | WO 00/24449 | 5/2000 |
| WO | WO 01/36507 A1 | 5/2001 |
| WO | WO 01/36508 A1 | 5/2001 |
| WO | WO 01/66623 A1 | 9/2001 |
| WO | WO 03/011925 A1 | 2/2003 |
| WO | WO 03/042270 A1 | 5/2003 |
| WO | WO 03/044070 A1 | 5/2003 |
| WO | WO 2004/060951 A1 | 7/2004 |
| WO | WO 2004/060971 A2 | 7/2004 |

* cited by examiner

US 7,687,597 B2

THIOETHER FUNCTIONAL OLIGOMERIC POLYTHIOLS AND ARTICLES PREPARED THEREFROM

CROSS REFERENCE TO RELATED APPLICATIONS

This application claims the benefit of priority of U.S. Provisional Patent Application No. 60/797,985, filed May 5, 2006.

FIELD OF THE INVENTION

The present invention relates to oligomeric polythiols having thioether functionality, and their use in preparing polymers and sulfur-containing polyurethane and poly(ureaurethane) articles having useful optical properties.

BACKGROUND OF THE INVENTION

Optical elements that provide acceptable optical qualities while maintaining durability and abrasion resistance are sought for a variety of applications, such as windshields, sunglasses, fashion lenses, non-prescription and prescription lenses, sport masks, face shields and goggles. Responsive to that need, optical elements prepared from a variety of durable organic polymers have been developed.

A number of organic polymeric materials, such as plastics, have been developed as alternatives and replacements for glass in applications such as optical lenses, fiber optics, windows and automotive, nautical and aviation transparencies. These polymeric materials can provide advantages relative to glass including shatter resistance, lighter weight for a given application, ease of molding and ease of dyeing. However, the refractive indices of many polymeric materials are lower than that of glass. In ophthalmic applications, the use of a polymeric material having a lower refractive index will require a thicker lens, which is generally undesirable, relative to a material having a higher refractive index.

Thus, there is a need in the art to develop a polymeric material having an adequate refractive index and good impact resistance/strength for practical use in optical articles, at a reasonable cost.

SUMMARY OF THE INVENTION

The present invention provides a thioether-functional, oligomeric polythiol having pendant hydroxyl functional groups, prepared by reacting together:
(a) a compound having at least two thiol functional groups; and
(b) a hydroxyl functional compound having triple bond functionality.

The present invention also is directed to a rigid optical article comprising a reaction product of:
(A) a reactive compound comprising a material having functional groups that are reactive with active hydrogens;
(B) a thioether-functional, oligomeric polythiol having pendant hydroxyl functional groups, prepared by reacting together:
(1) a compound having at least two thiol functional groups; and
(2) a hydroxyl functional compound having triple bond functionality; and optionally
(C) a compound different from (B) containing active hydrogens.

Also provided is a rigid optical article comprising a reaction product of:
(A) a reactive compound comprising a material having functional groups that are reactive with active hydrogens;
(B) a thioether-functional, oligomeric polythiol prepared by reacting together:
(1) a compound having at least two thiol functional groups; and
(2) a compound having triple bond functionality; and optionally
(C) a compound different from (B) containing active hydrogens.

DETAILED DESCRIPTION OF THE INVENTION

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and other parameters used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

All numerical ranges herein include all numerical values and ranges of all numerical values within the recited numerical ranges. Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The various embodiments and examples of the present invention as presented herein are each understood to be non-limiting with respect to the scope of the invention.

As used in the following description and claims, the following terms have the meanings indicated below:

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_5$ substituted acrylic acids, such as methacrylic acid, ethacrylic acid, etc., and their $C_1$-$C_5$ alkyl esters, unless clearly indicated otherwise. The terms "(meth)acrylic" or "(meth)acrylate" are intended to encompass both the acrylic/acrylate and methacrylic/methacrylate forms of the indicated material, e.g., a (meth)acrylate monomer.

The terms "oligomer" and "oligomeric" are intended to refer to compounds prepared by addition polymerization to yield a material having repeating units and having a number average molecular weight up to 5000, or up to 2000, or between 200 and 1200. The number average molecular weight may be determined by gel permeation chromatography using a polystyrene standard.

The term "curable", as used for example in connection with a curable composition, means that the indicated composition is polymerizable or cross-linkable through functional groups, e.g., by means that include, but are not limited to, thermal, catalytic, electron beam, chemical free-radical initiation, and/or photo-initiation such as by exposure to ultraviolet light or other actinic radiation.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate, such that said polymerizate can be demolded, and cut into test pieces, or such that it may be subjected to machining operations, including optical lens processing. The polymerizable composition can also be subjected to curing conditions such that a substantially complete cure is attained and wherein further curing results in no significant further improvement in polymer properties, such as hardness.

The term "reactive compound" refers to a compound capable of undergoing a chemical reaction with itself and/or other compounds spontaneously or upon the application of heat, actinic radiation, or in the presence of a catalyst or by any other means known to those skilled in the art.

The terms "on", "appended to", "affixed to", "bonded to", "adhered to", or terms of like import mean that the designated item, e.g., a coating, film or layer, is either directly connected to (e.g., superimposed on) the object surface, or indirectly connected to the object surface, e.g., through one or more other coatings, films or layers (superposed on).

The term "ophthalmic" refers to elements and devices that are associated with the eye and vision, such as but not limited to, lenses for eyewear, e.g., corrective and non-corrective lenses, and magnifying lenses.

The term "optical quality", as used for example in connection with polymeric materials, e.g., a "resin of optical quality" or "organic polymer material of optical quality" means that the indicated material, e.g., a polymeric material, resin, or resin composition, is or forms a substrate, layer, film or coating that can be used as an optical article, such as an ophthalmic lens, or in combination with an optical article.

The term "rigid", as used for example in connection with an optical substrate or an optical article, means that the specified item is self-supporting; i.e., capable of maintaining its shape and supporting any applied coatings and/or films. The optical substrate itself may be in the form of a film or sheet. A rigid item may also be defined as capable of being demolded and cut into test pieces, or subjected to machining operations, without permanent deformation. Alternatively, a rigid article may be described as having a Martens hardness of at least 20 $N/mm^2$, as defined herein.

The term "optical article" means that the specified article exhibits a visible light transmittance value (transmits incident light) of at least 4 percent, such as at least 50 percent, or at least 70 percent, or at least 85 percent; and exhibits a haze value of less than 5 percent, e.g., less than 1 percent or less than 0.5 percent, when the haze value is measured at 550 nanometers by, for example, a Haze Gard Plus Instrument. Optical articles can include, but are not limited to, fiber optics, windows and automotive, nautical and aviation transparencies, lenses, optical layers, e.g., optical resin layers, optical films, such as films and/or sheets suitable for electronic displays, e.g., monitors, screens, or security elements, optical coatings, and optical substrates having a light influencing property.

The term "photochromic receptive" means that the indicated item has sufficient free volume to permit photochromic material(s) incorporated within it to transform from its colorless form to its colored form (and then revert to its colorless form) to the degree required for commercial optical applications.

The term "tinted", as used for example in connection with ophthalmic elements and optical substrates, means that the indicated item contains a fixed light radiation absorbing agent, such as but not limited to, conventional coloring dyes and/or pigments, infrared and/or ultraviolet light absorbing materials on or in the indicated item. The tinted item has an absorption spectrum for visible radiation that does not vary significantly in response to actinic radiation.

The term "non-tinted", as used for example in connection with ophthalmic elements and optical substrates, means that that the indicated item is substantially free of fixed light radiation absorbing agents. The non-tinted item has an absorption spectrum for visible radiation that does not vary significantly in response to actinic radiation.

The term "radiation curable" refers to compositions that may be cured by means of ionizing radiation such as electron beam, actinic radiation, and the like.

The term "actinic radiation" includes light with wavelengths of electromagnetic radiation ranging from the ultraviolet ("UV") light range, through the visible light range, and into the infrared range. Actinic radiation which can be used to cure coating compositions used in the present invention generally has wavelengths of electromagnetic radiation ranging from 150 to 2,000 nanometers (nm), from 180 to 1,000 nm, or from 200 to 500 nm. In one embodiment, ultraviolet radiation having a wavelength ranging from 10 to 390 nm can be used. Examples of suitable ultraviolet light sources include xenon arc lamps, mercury arcs, carbon arcs, low, medium or high pressure mercury lamps, swirl-flow plasma arcs and ultraviolet light emitting diodes. Suitable ultraviolet light-emitting lamps are medium pressure mercury vapor lamps having outputs ranging from 200 to 600 watts per inch (79 to 237 watts per centimeter) across the length of the lamp tube.

The term "transparent", as used for example in connection with a substrate, film, material and/or coating, means that the indicated substrate, coating, film and/or material has the property of transmitting light without appreciable scattering so that objects lying beyond are entirely visible.

The present invention is directed to thioether-functional, oligomeric polythiols having pendant hydroxyl groups. Further, the present invention is directed to compositions comprising thioether-functional, oligomeric polythiols, including, but not necessarily limited to, those mentioned above having pendant hydroxyl groups. Such compositions can be used to prepare coating compositions and polymerizates employed in the manufacture of articles such as optical articles. Additionally, the present invention provides processes for the preparation of rigid articles such as rigid optical articles comprising thioether-functional, oligomeric polythiols such as those previously mentioned.

Thioether-Functional, Oligomeric Polythiols Having Pendant Hydroxyl Groups:

As mentioned above, the present invention provides, a thioether-functional, oligomeric polythiol having pendant hydroxyl functional groups prepared by reacting together:

(a) a compound having at least two thiol functional groups; and (b) a hydroxyl functional compound having triple bond functionality.

The compound (a) having at least two thiol functional groups may comprise a polythiol, i.e., a dithiol, a compound having more than two thiol functional groups (a higher polythiol), or a mixture thereof. Such mixtures may include mixtures of dithiols, mixtures of higher polythiols or mixtures of dithiols and higher polythiols. In an embodiment of the present invention, the compound (a) having at least two thiol functional groups comprises a dithiol, a compound having more than two thiol functional groups, or a mixture of a dithiol and a compound having more than two thiol functional groups. The thiol functional groups are typically terminal groups, though a minor portion (e.g., less than 50 percent of all groups) may be pendant along a chain. The compound (a) may additionally contain a minor portion of other active hydrogen functionality (i.e., different from thiol), for example, hydroxyl functionality. The compound (a) may be linear or branched, and may contain cyclic, alkyl, aryl, aralkyl, or alkaryl groups.

The compound (a) can be selected so as to produce a substantially linear oligomeric polythiol. Therefore, when the compound (a) comprises a mixture of a dithiol and a compound having more than two thiol functional groups, the compound having more than two thiol functional groups can be present in an amount up to 10 percent by weight of the mixture.

Suitable dithiols can include linear or branched aliphatic, cycloaliphatic, aromatic, heterocyclic, polymeric, oligomeric dithiols and mixtures thereof. The dithiol can comprise a variety of linkages including but not limited to ether linkages (—O—), sulfide linkages (—S—), polysulfide linkages (—$S_x$—, wherein x is at least 2, or from 2 to 4), ester linkages, amide linkages and combinations of such linkages.

Non-limiting examples of suitable dithiols for use in the present invention can include but are not limited to 2,5-dimercaptomethyl-1,4-dithiane, dimercaptodiethylsulfide (DMDS), ethanedithiol, 3,6-dioxa-1,8-octanedithiol, ethylene glycol di(2-mercaptoacetate), ethylene glycol di(3-mercaptopropionate), poly(ethylene glycol) di(2-mercaptoacetate) and poly(ethylene glycol) di(3-mercaptopropionate), benzenedithiol, 4-tert-butyl-1,2-benzenedithiol, 4,4'-thiodibenzenethiol, and mixtures thereof.

The dithiol may include dithiol oligomers having disulfide linkages such as materials represented by the following graphic formula I:

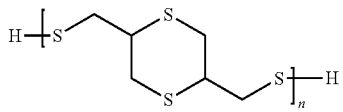
(I)

wherein n can represent an integer from 1 to 21.

Dithiol oligomers represented by Formula I can be prepared, for example, by the reaction of 2,5-dimeracaptomethyl-1,4-dithiane with sulfur in the presence of basic catalyst, as known in the art.

The nature of the SH group in polythiols is such that oxidative coupling can occur readily, leading to formation of disulfide linkages. Various oxidizing agents can lead to such oxidative coupling. The oxygen in the air can in some cases lead to such oxidative coupling during storage of the polythiol. It is believed that a possible mechanism for the oxidative coupling of thiol groups involves the formation of thiyl radicals, followed by coupling of said thiyl radicals, to form disulfide linkage. It is further believed that formation of disulfide linkage can occur under conditions that can lead to the formation of thiyl radical, including but not limited to reaction conditions involving free radical initiation. The polythiols suitable for use as compound (a) in the preparation of the polythiols of the present invention can include species containing disulfide linkages formed during storage. The polythiols suitable for use as compound (a) in the preparation of any of the oligomeric polythiols of the present invention also can include species containing disulfide linkages formed during synthesis of the polythiol.

In certain embodiments, the dithiol suitable for use in the present invention, can include at least one dithiol represented by the following graphic formulas:

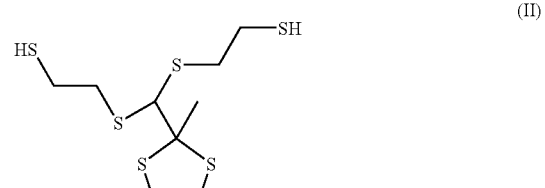
(II)

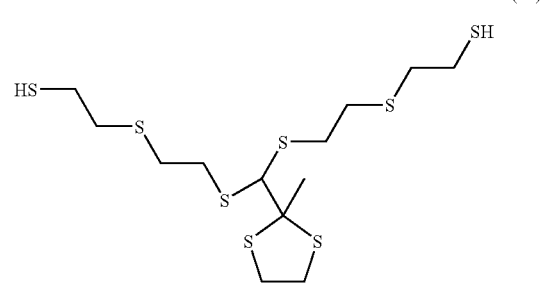
(III)

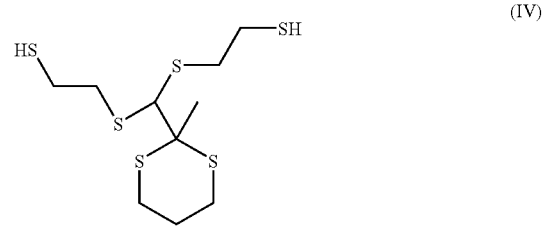
(IV)

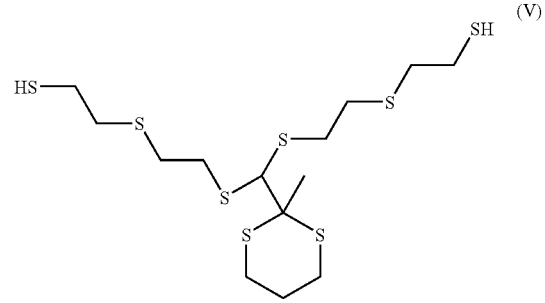
(V)

The sulfide-containing dithiols comprising 1,3-dithiolane (e.g., formulas II and III) or 1,3-dithiane (e.g., formulas IV and V) can be prepared by reacting asym-dichloroacetone with dimercaptan, and then reacting the reaction product with dimercaptoalkylsulfide, dimercaptan or mixtures thereof, as described in U.S. Pat. No. 7,009,032 B2.

Non-limiting examples of suitable dimercaptans for use in the reaction with asym-dichloroacetone can include but are not limited to materials represented by the following formula VI:

(VI)

wherein Y can represent $CH_2$ or $(CH_2-S-CH_2)$, and n' can be an integer from 0 to 5. The dimercaptan suitable for reaction with asym-dichloroacetone in the present invention can be chosen from, for example, ethanedithiol, propanedithiol, and mixtures thereof.

The amount of asym-dichloroacetone and dimercaptan suitable for carrying out the above reaction can vary. For example, asym-dichloroacetone and dimercaptan can be present in the reaction mixture in an amount such that the molar ratio of dichloroacetone to dimercaptan can be from 1:1 to 1:10.

Suitable temperatures for reacting asym-dichloroacetone with dimercaptan can vary, often ranging from 0 to 100° C.

Non-limiting examples of suitable dimercaptans for use in the reaction with the reaction product of the asym-dichloroacetone and dimercaptan, can include but are not limited to materials represented by the above general formula VI, aromatic dimercaptans, cycloalkyl dimercaptans, heterocyclic dimercaptans, branched dimercaptans, and mixtures thereof.

Non-limiting examples of suitable dimercaptoalkylsulfides for use in the reaction with the reaction product of the asym-dichloroacetone and dimercaptan, can include but are not limited to materials represented by the following formula:

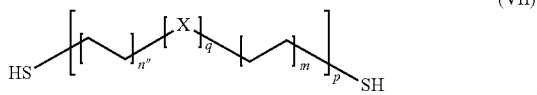

(VII)

wherein X can represent O, S or Se, n" can be an integer from 0 to 10, m can be an integer from 0 to 10, p can be an integer from 1 to 10, q can be an integer from 0 to 3, and with the proviso that (m+n") is an integer from 1 to 20.

Non-limiting examples of suitable dimercaptoalkylsulfides for use in the present invention can include branched dimercaptoalkylsulfides.

The amount of dimercaptan, dimercaptoalkylsulfide, or mixtures thereof, suitable for reacting with the reaction product of asym-dichloroacetone and dimercaptan, can vary. Typically, dimercaptan, dimercaptoalkylsulfide, or a mixture thereof, can be present in the reaction mixture in an amount such that the equivalent ratio of reaction product to dimercaptan, dimercaptoalkylsulfide, or a mixture thereof, can be from 1:1.01 to 1:2. Moreover, suitable temperatures for carrying out this reaction can vary within the range of from 0 to 100° C.

The reaction of asym-dichloroacetone with dimercaptan can be carried out in the presence of an acid catalyst. The acid catalyst can be selected from a wide variety known in the art, such as but not limited to Lewis acids and Bronsted acids. Non-limiting examples of suitable acid catalysts can include those described in Ullmann's Encyclopedia of Industrial Chemistry, 5$^{th}$ Edition, 1992, Volume A21, pp. 673 to 674. The acid catalyst is often chosen from boron trifluoride etherate, hydrogen chloride, toluenesulfonic acid, and mixtures thereof. The amount of acid catalyst can vary from 0.01 to 10 percent by weight of the reaction mixture.

The reaction product of asym-dichloroacetone and dimercaptan can alternatively be reacted with dimercaptoalkylsulfide, dimercaptan or mixtures thereof, in the presence of a base. The base can be selected from a wide variety known in the art, such as but not limited to Lewis bases and Bronsted bases. Non-limiting examples of suitable bases can include those described in Ullmann's Encyclopedia of Industrial Chemistry, 5$^{th}$ Edition, 1992, Volume A21, pp. 673 to 674. The base is often sodium hydroxide. The amount of base can vary. Typically, a suitable equivalent ratio of base to reaction product of the first reaction can be from 1:1 to 10:1.

The reaction of asym-dichloroacetone with dimercaptan can be carried out in the presence of a solvent. The solvent can be selected from but is not limited to organic solvents. Non-limiting examples of suitable solvents can include but are not limited to chloroform, dichloromethane, 1,2-dichloroethane, diethyl ether, benzene, toluene, acetic acid and mixtures thereof.

In another embodiment, the reaction product of asym-dichloroacetone and dimercaptan can be reacted with dimercaptoalkylsulfide, dimercaptan or mixtures thereof, in the presence of a solvent, wherein the solvent can be selected from but is not limited to organic solvents. Non-limiting examples of suitable organic solvents can include alcohols such as but not limited to methanol, ethanol and propanol; aromatic hydrocarbon solvents such as but not limited to benzene, toluene, xylene; ketones such as but not limited to methyl ethyl ketone; water; and mixtures thereof.

The amount of solvent can widely vary, from 0 to 99 percent by weight of the reaction mixtures. Alternatively, the reactions can be carried out neat, i.e., without solvent.

The reaction of asym-dichloroacetone with dimercaptan can also be carried out in the presence of a dehydrating reagent. The dehydrating reagent can be selected from a wide variety known in the art. Suitable dehydrating reagents for use in this reaction can include but are not limited to magnesium sulfate. The amount of dehydrating reagent can vary widely according to the stoichiometry of the dehydrating reaction.

The compound (a) having at least two thiol functional groups, used to prepare the oligomeric polythiols of the present invention, can be prepared in certain non-limiting embodiments by reacting 2-methyl-2-dichloromethyl-1,3-dithiolane with dimercaptodiethylsulfide to produce dimercapto-1,3-dithiolane derivative of formula III. Alternatively, 2-methyl-2-dichloromethyl-1,3-dithiolane can be reacted with 1,2-ethanedithiol to produce dimercapto-1,3-dithiolane derivative of formula II. 2-methyl-2-dichloromethyl-1,3-dithiane can be reacted with dimercaptodiethylsulfide to produce dimercapto-1,3-dithiane derivative of formula V. Also, 2-methyl-2-dichloromethyl-1,3-dithiane can be reacted with 1,2-ethanedithiol to produce dimercapto-1,3-dithiane derivative of formula IV.

Another non-limiting example of a dithiol suitable for use as compound (a) in the preparation of the oligomeric polythiol of the present invention can include at least one dithiol oligomer prepared by reacting dichloro derivative with dimercaptoalkylsulfide as follows in Reaction Scheme A:

Reaction Scheme A

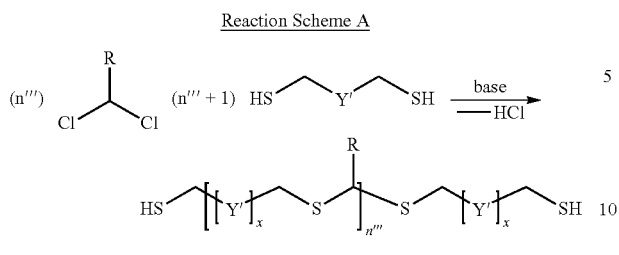

wherein R can represent $CH_3$, $CH_3CO$, $C_1$ to $C_{10}$ alkyl, cycloalkyl, aryl alkyl, or alkyl-CO; Y' can represent $C_1$ to $C_{10}$ alkyl, cycloalkyl, $C_6$ to $C_{14}$ aryl, $(CH_2)_{p'}(S)_{m'}(CH_2)_{q'}$, $(CH_2)_{p'}(Se)_{m'}(CH_2)_{q'}$, $(CH_2)_{p'}(Te)_{m'}(CH_2)_{q'}$ wherein m' can be an integer from 1 to 5 and, p' and q' can each be an integer from 1 to 10; n''' can be an integer from 1 to 20; and x can be an integer from 0 to 10.

The reaction of dichloro derivative with dimercaptoalkylsulfide can be carried out in the presence of a base. Suitable bases include any known to those skilled in the art in addition to those disclosed above.

The reaction of dichloro derivative with dimercaptoalkylsulfide may be carried out in the presence of a phase transfer catalyst. Suitable phase transfer catalysts for use in the present invention are known and varied. Non-limiting examples can include but are not limited to tetraalkylammonium salts and tetraalkylphosphonium salts. This reaction is often carried out in the presence of tetrabutylphosphonium bromide as phase transfer catalyst. The amount of phase transfer catalyst can vary widely, for example, from 0 to 50 equivalent percent, or from 0 to 10 equivalent percent, or from 0 to 5 equivalent percent, relative to the dimercaptosulfide reactants.

The compound (a) having at least two thiol functional groups may further contain hydroxyl functionality. Non-limiting examples of suitable materials having both hydroxyl and multiple (more than one) thiol groups can include but are not limited to glycerin bis(2-mercaptoacetate), glycerin bis(3-mercaptopropionate), 1,3-dimercapto-2-propanol, 2,3-dimercapto-1-propanol, trimethylolpropane bis(2-mercaptoacetate), trimethylolpropane bis(3-mercaptopropionate), pentaerythritol bis(2-mercaptoacetate), pentaerythritol tris (2-mercaptoacetate), pentaerythritol bis(3-mercaptopropionate), pentaerythritol tris(3-mercaptopropionate), and mixtures thereof.

In addition to dithiols disclosed above, particular examples of suitable dithiols for use as or in preparing the compound (a) can include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methyl butane, dipentenedimercaptan, ethylcyclohexyldithiol (ECHDT), dimercaptodiethylsulfide (DMDS), methyl-substituted dimercaptodiethylsulfide, dimethyl-substituted dimercaptodiethylsulfide, 3,6-dioxa-1,8-octanedithiol, 1,5-dimercapto-3-oxapentane, 2,5-dimercaptomethyl-1,4-dithiane (DMMD), ethylene glycol di(2-mercaptoacetate), ethylene glycol di(3-mercaptopropionate), and mixtures thereof.

Suitable trifunctional or higher-functional polythiols for use as or in the preparation of compound (a) can be selected from a wide variety known in the art. Non-limiting examples can include pentaerythritol tetrakis(2-mercaptoacetate), pentaerythritol tetrakis(3-mercaptopropionate), trimethylolpropane tris(2-mercaptoacetate), trimethylolpropane tris(3-mercaptopropionate), and/or thioglycerol bis(2-mercaptoacetate).

For example, the polythiol can be chosen from materials represented by the following formula VIII,

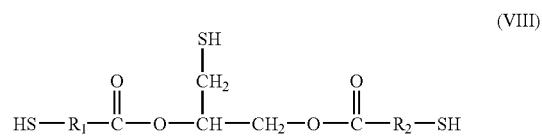

wherein $R_1$ and $R_2$ can each be independently chosen from straight or branched chain alkylene, cyclic alkylene, phenylene and $C_1$-$C_8$ alkyl substituted phenylene. Non-limiting examples of straight or branched chain alkylene can include methylene, ethylene, 1,3-propylene, 1,2-propylene, 1,4-butylene, 1,2-butylene, pentylene, hexylene, heptylene, octylene, nonylene, decylene, undecylene, octadecylene and icosylene. Non-limiting examples of cyclic alkylenes can include cyclopentylene, cyclohexylene, cycloheptylene, cyclooctylene, and alkyl-substituted derivatives thereof. The divalent linking groups $R_1$ and $R_2$ can be chosen from methylene, ethylene, phenylene, and alkyl-substituted phenylene, such as methyl, ethyl, propyl, isopropyl and nonyl substituted phenylene.

In particular embodiments, the compound (a) having at least two thiol functional groups may be prepared by reacting together (1) any of the dithiols mentioned above, and (2) a compound having at least two double bonds (for example, a diene). Such compounds having at least two double bonds are described in more detail below, as are reaction methods.

The compound (b) having triple bond functionality, used to prepare the oligomeric polythiols of the present invention, may comprise any alkyne known to those skilled in the art. In the preparation of the thioether-functional oligomeric polythiols having pendant hydroxyl functional groups, the compound (b) may comprise any hydroxyl functional alkyne known in the art such as those described immediately below. Because a triple bond can react twice with a thiol functional group, for the purposes of the present invention, a triple bond is understood to be equal to two equivalents of a double bond when determining reaction stoichiometry.

Suitable non-limiting examples of hydroxyl functional compounds having triple bond functionality include propargyl alcohol, 2-butyne-1,4-diol, 3-butyne-2-ol, 3-hexyne-2,5-diol, and/or mixtures thereof. A portion of the hydroxyl functional groups on the compound (b) may be esterified. For example, a portion of the compound (b) may comprise an alkyne-functional ester of a $C_1$-$C_{12}$ carboxylic acid such as propargyl acetate, propargyl propionate, propargyl benzoate, and the like. Moreover, in the preparation of the thioether-functional, oligomeric polythiols having pendant hydroxyl groups, a portion of the triple bond-containing compound (b) can comprise, in addition to the hydroxyl functional, triple bond-containing compound, a triple-bond-containing compound which contains no hydroxyl functional groups such as those described hereinbelow.

In the preparation of the oligomeric polythiol of the present invention, the ratio of thiol functional groups in compound (a) to triple bonds in compound (b) typically ranges from 1.01:1 to 2.0:1, 1.01:1 to 5.0:1, such as 1:3:1 to 2.0:1, and 1.5:1 to 2.0:1. In some instances the presence of an excess of thiol functional groups may be desirable during the reaction as well as in the reaction product as unreacted compound (a). For example, the presence of excess thiol present during the reaction may enhance the reaction rate. Also unreacted thiol, e.g., in the form of unreacted compound (a), can be present in the final reaction product and thus available to subsequently react with, for example, a reactive compound having functional groups reactive with active hydrogens (such as are described below). Thus, in an embodiment of the present invention the reaction ratio of thiol functional groups in the compound (a) to triple bonds in the compound (b) can range from 1.01:1 to 20:1, such as 1.01:1 to 10:1, or 1.01:1 to 5:1, or 1.5:1 to 5:1; or 1.5:1 to 3:1.

To prepare the oligomeric polythiols of the present invention, the reaction of the compound (a) with triple bond-containing compounds (b) can be carried out in the presence of radical initiator. Suitable radical initiators for use in the present invention can vary widely and can include those known to one of ordinary skill in the art. Non-limiting examples of radical initiators can include but are not limited to azo or peroxide type free-radical initiators such as azobisalkalenenitriles. The free-radical initiator can be azobisalkalenenitrile which is commercially available from DuPont under the trade name VAZO™. VAZO-52, VAZO-64, VAZO-67, VAZO-88 and mixtures thereof can also be used as radical initiators.

Selection of the free-radical initiator can depend on reaction temperature. The reaction temperature can vary, for example, from room temperature to 120° C. VAZO 52 can be used at a temperature of from 50-60° C. VAZO 64 and VAZO 67 can be used at a temperature of 60-100° C., and VAZO 88 can be used at a temperature of 70-120° C.

The amount of free radical initiator used in the reaction of the present invention can vary widely and can depend on the free radical initiator selected. Typically, the free radical initiator is present in an amount of from 0.01% by weight to 5% by weight of the reaction mixture.

The reaction of the compound (a) with triple bond-containing compounds (b) can be carried out under a variety of reaction conditions. Such conditions can depend on the degree of reactivity of the triple bond containing compound and the desired structure of the resulting polythiol oligomer. In one reaction scheme, the reactants and a radical initiator can be combined together while heating the mixture. Alternatively, triple bond containing-compounds can be added in relatively small amounts over a period of time to a mixture of polythiol and radical initiator at a certain temperature. Also, triple bond containing-compounds can be combined with the compound (a) having at least two thiol functional groups in a stepwise manner under radical initiation. Also, the radical initiator can be dissolved in the triple bond-containing compound (b), and the resulting solution can be added dropwise to the compound (a).

The present invention also is directed to a composition, such as a coating composition, comprising any of the thioether functional, oligomeric polythiols as previously described. The composition can further comprise a reactive compound comprising a material having functional groups that are reactive with active hydrogens, such as any of such compounds described in detail hereinbelow.

The present invention also is directed to, a thioether-functional, oligomeric polythiol having pendant hydroxyl functional groups prepared by reacting together:

(a) a compound having at least two thiol functional groups such as any of those described above;
(b) a compound having triple bond functionality such as any of those described above; and
(c) a compound having at least two double bonds.

The compound (a) having at least two thiol functional groups may be any of the previously mentioned thioether-functional, oligomeric polythiols, including those described above, prepared in accordance with the present invention. In one embodiment of the present invention, the compound (a) comprises a reaction product of (1) any of the dithiols mentioned above, and (2) a compound having at least two double bonds, which may be the same as or different from the compound (c). The compound (b) can be any of the previously mentioned compounds having triple bond functionality, including the hydroxyl functional compounds having triple bond functionality.

The compound (c) having at least two double bonds can be chosen from non-cyclic dienes, including straight chain and/or branched aliphatic non-cyclic dienes, non-aromatic ring-containing dienes, including non-aromatic ring-containing dienes wherein the double bonds can be contained within the ring or not contained within the ring or any combination thereof, and wherein the non-aromatic ring-containing dienes can contain non-aromatic monocyclic groups or non-aromatic polycyclic groups or combinations thereof; aromatic ring-containing dienes; or heterocyclic ring-containing dienes; or dienes containing any combination of such non-cyclic and/or cyclic groups. The dienes can optionally contain thioether, disulfide, polysulfide, sulfone, ester, thioester, carbonate, thiocarbonate, urethane, or thiourethane linkages, or halogen substituents, or combinations thereof; with the proviso that the dienes contain at least some double bonds capable of undergoing reaction with SH groups of a polythiol, and forming covalent C—S bonds. Often the compound (c) having at least two double bonds comprises a mixture of dienes that are different from one another.

The compound (c) having at least two double bonds may comprise acyclic non-conjugated dienes, acyclic polyvinyl ethers, allyl-(meth)acrylates vinyl-(meth)acrylates, di(meth)acrylate esters of diols, di(meth)acrylate esters of dithiols, di(meth)acrylate esters of poly(alkyleneglycol) diols, monocyclic non-aromatic dienes, polycyclic non-aromatic dienes, aromatic ring-containing dienes, diallyl esters of aromatic ring dicarboxylic acids, divinyl esters of aromatic ring dicarboxylic acids, and/or mixtures thereof.

Non-limiting examples of acyclic non-conjugated dienes can include those represented by the following formula IX:

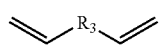

(IX)

wherein $R_3$ can represent $C_1$ to $C_{30}$ linear or branched divalent saturated alkylene radical, or $C_2$ to $C_{30}$ divalent organic radical including groups such as but not limited to those containing ether, thioether, ester, thioester, ketone, polysulfide, sulfone and combinations thereof. The acyclic non-conjugated dienes can be selected from 1,5-hexadiene, 1,6-heptadiene, 1,7-octadiene and mixtures thereof.

Non-limiting examples of suitable acyclic polyvinyl ethers can include those represented by the following formula X:

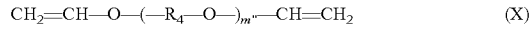

(X)

wherein $R_4$ can be $C_2$ to $C_6$ n-alkylene, $C_3$ to $C_6$ branched alkylene group, or —[(CH$_2$—)$_{p''}$—O—]$_{q''}$—(—CH$_2$—)$_{r'}$—, m" can be a rational number from 0 to 10, often 2; p" can be an integer from 2 to 6, q" can be an integer from 1 to 5 and r' can be an integer from 2 to 10.

Non-limiting examples of suitable polyvinyl ether monomers for use can include divinyl ether monomers, such as ethylene glycol divinyl ether, diethylene glycol divinyl ether, triethyleneglycol divinyl ether, and mixtures thereof.

Di(meth)acrylate esters of linear diols can include ethanediol di(meth)acrylate, 1,3-propanediol dimethacrylate, 1,2-propanediol di(meth)acrylate, 1,4-butanediol di(meth)acrylate, 1,3-butanediol di(meth)acrylate, 1,2-butanediol di(meth)acrylate, and mixtures thereof.

Di(meth)acrylate esters of dithiols can include, for example, di(meth)acrylate of 1,2-ethanedithiol including oligomers thereof, di(meth)acrylate of dimercaptodiethyl sulfide (i.e., 2,2'-thioethanedithiol di(meth)acrylate) including oligomers thereof, di(meth)acrylate of 3,6-dioxa-1,8-octanedithiol including oligomers thereof, di(meth)acrylate of 2-mercaptoethyl ether including oligomers thereof, di(meth)acrylate of 4,4'-thiodibenzenethiol, and mixtures thereof.

Further non-limiting examples of suitable dienes can include monocyclic aliphatic dienes such as those represented by the following graphic formula XI:

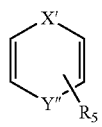

(XI)

wherein X' and Y" each independently can represent $C_{1-10}$ divalent saturated alkylene radical; or $C_{1-5}$ divalent saturated alkylene radical, containing at least one element selected from the group of sulfur, oxygen and silicon in addition to the carbon and hydrogen atoms; and $R_5$ can represent H, or $C_1$-$C_{10}$ alkyl; and those represented by the following graphic formula XII:

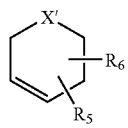

(XII)

wherein X' and $R_5$ can be as defined above and $R_6$ can represent $C_2$-$C_{10}$ alkenyl. The monocyclic aliphatic dienes can include 1,4-cyclohexadiene, 4-vinyl-1-cyclohexene, dipentene and terpinene.

Non-limiting examples of polycyclic aliphatic dienes can include 5-vinyl-2-norbornene; 2,5-norbornadiene; dicyclopentadiene and mixtures thereof.

Non-limiting examples of aromatic ring-containing dienes can include those represented by the following graphic formula XIII:

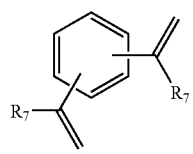

(XIII)

wherein $R_4$ can represent hydrogen or methyl. Aromatic ring-containing dienes can include monomers such as diisopropenyl benzene, divinyl benzene and mixtures thereof.

Examples of diallyl esters of aromatic ring dicarboxylic acids can include but are not limited to those represented by the following graphic formula XIV:

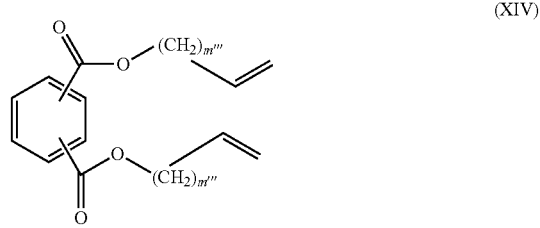

(XIV)

wherein each m''' independently can be an integer from 0 to 5. The diallyl esters of aromatic ring dicarboxylic acids can include o-diallyl phthalate, m-diallyl phthalate, p-diallyl phthalate and mixtures thereof.

Often, the compound (c) having at least two double bonds comprises 5-vinyl-2-norbornene, ethylene glycol divinyl ether, diethylene glycol divinyl ether, triethylene glycol divinyl ether, butane diol divinyl ether, vinylcyclohexene, 4-vinyl-1-cyclohexene, dipentene, terpinene, dicyclopentadiene, cyclododecadiene, cyclooctadiene, 2-cyclopenten-1-yl-ether, 2,5-norbornadiene, divinylbenzene including 1,3-divinylbenzene, 1,2-divinylbenzene, and 1,4-divinylbenzene, diisopropenylbenzene including 1,3-diisopropenylbenzene, 1,2-diisopropenylbenzene, and 1,4-diisopropenylbenzene, allyl(meth)acrylate, ethanediol di(meth)acrylate, 1,3-propanediol di(meth)acrylate, 1,2-propanediol di(meth)acrylate, 1,3-butanediol di(meth)acrylate, 1,2-butanediol di(meth)acrylate, ethylene glycol di(meth)acrylate, diethylene glycol di(meth)acrylate, dimercaptodiethylsulfide di(meth)acrylate, 1,2-ethanedithiol di(meth)acrylate, and/or mixtures thereof.

Other non-limiting examples of suitable di(meth)acrylate monomers can include ethylene glycol di(meth)acrylate, 1,3-butylene glycol di(meth)acrylate, 1,4-butanediol di(meth)acrylate, 2,3-dimethyl-1,3-propanediol di(meth)acrylate, 1,6-hexanediol di(meth)acrylate, propylene glycol di(meth)acrylate, dipropylene glycol di(meth)acrylate, tripropylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, cyclohexane dimethanol di(meth)acrylate, and ethoxylated bis-phenol A di(meth)acrylate.

For purposes of the present invention in the preparation of any of the oligomeric polythiols comprising reactants (a), (b), and (c), the reactants (a), (b), and (c) may all be reacted together simultaneously (as in a "one pot" process) or mixed together incrementally in various combinations. For example, compound (a) having at least two thiol functional groups may be reacted first with the compound (b) having triple bond functionality in a first reaction vessel to produce a first reaction product, followed by addition of the compound (c) having at least two double bonds to the reaction mixture to react with the first reaction product and yield the oligomeric polythiol of the present invention (or addition of the first reaction product to a second reaction vessel containing the compound (c)). As an alternative, the compound (a) may be reacted first with the compound (c) having at least two double bonds to produce a first reaction product, followed by addition of the compound (b) to yield the oligomeric polythiol. In this embodiment, one may optionally add, simultaneously with or after compound (b), an additional compound (c) having at least two double bonds, which may be the same as or different from that reacted earlier with compound (a) to form the first reaction product.

When the compound (a) is combined first with the compound (c), it is believed that they react via a thiol-ene type reaction of the SH groups of (a) with double bond groups of (c). Such reactions may typically take place in the presence of a radical initiator as mentioned above, or in the presence of a base catalyst, particularly when the compound (c) comprises a compound having at least one (meth)acrylate type double bonds. Suitable base catalysts for use in this reaction can vary widely and can be selected from those known in the art. Non-limiting examples can include tertiary amine bases such as 1,8-diazabicyclo[5.4.0]undec-7-ene (DBU) and N,N-dimethylbenzylamine. The amount of base catalyst used can vary widely, but typically it is present in an amount of from 0.001 to 5.0% by weight of the mixture of (a) and (c).

The stoichiometric ratio of the sum of the number of thiol equivalents of all polythiols present (compound (a)) to the sum of the number of equivalents of all double bonds present (including alkyne functionality effective as two double bond equivalents as discussed above) is greater than 1:1. In non-limiting embodiments, said ratio can be within the range of from greater than 1:1 to 3:1, or from 1.01:1 to 3:1, or 1.01:1 to 5:1, or from 1.01:1 to 2:1, or from 1.05:1 to 2:1, or from 1.1:1 to 1.5:1, or from 1.25:1 to 1.5:1.

Various methods of reacting polyvinyl ether monomers and one or more dithiol materials are described in detail in U.S. Pat. No. 6,509,418B1, column 4, line 52 through column 8, line 25, which disclosure is herein incorporated by reference. Various methods of reacting allyl sulfide and dimercaptodiethylsulfide are described in detail in WO 03/042270, page 2, line 16 to page 10, line 7, which disclosure is incorporated herein by reference. Various methods for reacting a dithiol and an aliphatic, ring-containing non-conjugated diene in the presence of free radical initiator are described in detail in WO/01/66623A1, from page 3, line 19 to page 6, line 11, the disclosure of which is incorporated herein by reference.

In reacting the compounds (a) and (c), it may be advantageous to use one or more free radical initiators. Non-limiting examples of suitable free radical initiators can include azo compounds, such as those described above; organic peroxides such as but not limited to benzoyl peroxide and t-butyl peroxide; inorganic peroxides; and similar free-radical generators.

Alternately, the reaction of compounds (a) and (c) can be effected by irradiation with ultraviolet light either with or without a photoinitiating moiety.

The mixture of (a) and (c) can be reacted for a time period of from 1 hour to 5 days and at a temperature of from 20° C. to 100° C. Often, the mixture is heated until a predetermined theoretical value for SH content is achieved.

The stoichiometric ratio of the sum of the number of equivalents of triple bond functional groups in compound (b) to the sum of the number of equivalents of double bonds in compound (c) is often within the range of from 0.01:0.99 to 1.00:0, or from 0.10:0.90 to 1.00:0, or from 0.20:0.80 to 1.00:0.

The present invention also is directed to a composition, such as a coating composition, comprising any of the thioether functional, oligomeric polythiols described immediately above comprising compounds (a), (b) and (c). The composition can further comprise any of the compounds having functional groups reactive with active hydrogens as described in detail hereinbelow.

Compositions and Articles Comprising Thioether Functional Oligomeric Polythiols:

As previously mentioned, the present invention provides a composition comprising a reaction product of:

(A) a reactive compound comprising a material having functional groups that are reactive with active hydrogens, such as any of those described herein below;

(B) a thioether functional, oligomeric polythiol prepared by reacting together:
  (1) a compound having at least two thiol functional groups such as any of those described previously;
  (2) a compound having triple bond functionality such as any of those described herein above and below and, optionally,
  (3) a compound having at least two double bonds such as any of those described previously; and, optionally, (C) a compound different from (B) containing active hydrogens such as any of those described herein below.

The compound having triple bond functionality may comprise any known alkyne, for example, propargyl alcohol, propargyl chloride, propargyl bromide, propargyl acetate, propargyl propionate, propargyl benzoate, phenyl acetylene, phenyl propargyl sulfide, 1,4-dichloro-2-butyne, 2-butyne-1, 4-diol, 3-butyne-2-ol, 2-pentyne, 1-hexyne, 2-hexyne, 3-hexyne, 3-hexyne-2,5-diol, and/or mixtures thereof.

The composition can be used to prepare any of the articles of manufacture described hereinbelow such as optical articles, including films and sheets; articles of manufacture for non-optical applications, for example, solar panels, body armor, interior and exterior aircraft and automotive parts such as doors, fascia, and propellers, housings for hand-held electronic devices such as cellular phones, and windmill blades; and coating compositions used to form various coatings, adhesives and/or sealants. In a particular embodiment, the composition comprises a coating composition which can provide coatings having excellent properties including, inter alia, impact and chemical resistance, flexibility, anti-microbial and fungicidal properties, as well as anti-ballistic and flame retardancy characteristics.

Any of the thioether-functional, oligomeric polythiols described herein, when reacted with a reactive compound having functional groups that are reactive with active hydrogens, can produce a polymerizate having a refractive index of at least 1.50, or at least 1.52, or at least 1.55, or at least 1.60, or at least 1.65, or at least 1.67. Additionally, the thioether-functional, oligomeric polythiol of the present invention, when reacted with a reactive compound having functional groups that are reactive with active hydrogens, can produce a polymerizate having an Abbe number of at least 30, or at least 35, or at least 38, or at least 39, or at least 40, or at least 44. The refractive index and Abbe number can be determined by methods known in the art such as American Standard Test Method (ASTM) Number D 542-00, using various known instruments. The refractive index and Abbe number can also be measured in accordance with ASTM D 542-00 with the following exceptions: (i) test one to two samples/specimens instead of the minimum of three specimens specified in Section 7.3; and (ii) test the samples unconditioned instead of conditioning the samples/specimens prior to testing as specified in Section 8.1. Further, an Atago model DR-M2 Multi- Wavelength Digital Abbe Refractometer can be used to measure the refractive index and Abbe number of the samples/specimens.

Further, any of the thioether-functional, oligomeric polythiols described herein, when reacted with a reactive compound having functional groups that are reactive with active hydrogens, can produce a polymerizate having a Martens hardness of at least 20 N/mm$^2$, or often at least 50, or more often between 70 and 200. Such polymerizates are typically not elastomeric; i.e., they are not substantially reversibly deformable (e.g., stretchable) due to their rigidity and do not typically exhibit properties characteristic of rubber and other elastomeric polymers.

Such polymerizates as discussed above may be used to prepare articles of manufacture having similar properties as described above, such as films, coatings, and molded items such as optical articles, in accordance with the present invention.

The present invention is further drawn to rigid articles, such as rigid optical articles, comprising a reaction product of:

(A) a reactive compound comprising a material having functional groups that are reactive with active hydrogens;

(B) a thioether-functional, oligomeric polythiol having pendant hydroxyl functional groups, as discussed above; and optionally (C) a compound different from (B) containing active hydrogens.

Optical articles of the present invention include ophthalmic articles such as piano (without optical power) and vision correcting (prescription) lenses (finished and semi-finished) including multifocal lenses (bifocal, trifocal, and progressive lenses); and ocular devices such as contact lenses and intraocular lenses, sun lenses, fashion lenses, sport masks, face shields and goggles. The optical article also may be chosen from glazings such as architectural windows and vehicular transparencies such as automobile or aircraft windshields and side windows.

In the preparation of the reaction products used to prepare the optical articles of the present invention, the reactants (A), (B), and (C) may all be reacted together simultaneously ("one pot") or mixed together incrementally in various combinations ("one or two pot"). Alternatively, reactive compound (A) may be reacted first with the oligomeric polythiol (B) to produce a prepolymer such as a sulfur-containing isocyanate-functional polyurethane, followed by post reaction of the compound (C) containing active hydrogens with the prepolymer to yield the reaction products of the present invention. In another alternative, reactive compound (A) may comprise an isocyanate-functional polyurethane prepolymer prepared by reacting a polyisocyanate with any of the thioether-functional, oligomeric polythiols disclosed herein (e.g., reaction products of a compound having at least two thiol functional groups, a compound having triple bond functionality, and optionally a compound having at least two double bonds) and optionally another active hydrogen-containing material. In this alternative, reactive compound (A) may be reacted with the oligomeric polythiol (B) and compound (C) containing active hydrogens in any combination or order. In embodiments wherein any of the reactants comprises two or more different compounds, the different compounds may be reacted as a mixture or added separately or even at different times/stages of the reaction. For example, the reaction product can be prepared by combining polyisocyanate and/or polyisothiocyanate, polythiol oligomer, optionally a first active hydrogen-containing material, and optionally a urethanation catalyst, to form a sulfur-containing polyurethane prepolymer, and then adding a second, different active hydrogen-containing material and optionally urethanation catalyst to the sulfur-containing polyurethane prepolymer, and polymerizing the resulting mixture.

Note that the polyurethane prepolymer may contain disulfide linkages due to disulfide linkages contained in the polythiol and/or polythiol oligomer used to prepare the polyurethane prepolymer.

Each of the reactants (A), (B) and (C) can be degassed (e.g. under vacuum) prior to mixing them and carrying out the polymerization. The reactants can be mixed using a variety of methods and equipment, such as but not limited to an impeller or extruder.

The reactive compound (A) comprising a material having functional groups that are reactive with active hydrogens may comprise, for example, a polyisocyanate, a blocked polyisocyanate, a polyisothiocyanate, a polyepoxide, a polyepisulfide, a polyacid, an anhydride, a polyanhydride, a polyethylenically unsaturated material such as a polyvinyl ether or poly(meth)acrylate, and/or mixtures of the above.

As used herein, the term "polyisocyanate" is intended to include blocked (or capped) polyisocyanates as well as unblocked polyisocyanates. Polyisocyanates and polyisothiocyanates useful in the reactive compound (A) are numerous and widely varied. Suitable polyisocyanates for use in the present invention can include but are not limited to polymeric and $C_2$-$C_{20}$ linear, branched, cyclic and aromatic polyisocyanates. Suitable polyisothiocyanates for use in the present invention can include but are not limited to polymeric and $C_2$-$C_{20}$ linear, branched, cyclic and aromatic polyisothiocyanates.

Non-limiting examples of suitable polyisocyanates and polyisothiocyanates can include polyisocyanates having at least two isocyanate groups; polyisothiocyanates having at least two isothiocyanate groups; mixtures thereof; and combinations thereof, such as a material having isocyanate and isothiocyanate functionality.

Non-limiting examples of polyisocyanates can include aliphatic polyisocyanates, cycloaliphatic polyisocyanates wherein one or more of the isocyanato groups are attached directly to the cycloaliphatic ring, cycloaliphatic polyisocyanates wherein one or more of the isocyanato groups are not attached directly to the cycloaliphatic ring, aromatic polyisocyanates wherein one or more of the isocyanato groups are attached directly to the aromatic ring, and aromatic polyisocyanates wherein one or more of the isocyanato groups are not attached directly to the aromatic ring. When an aromatic polyisocyanate is used, generally care should be taken to select a material that does not cause the final reaction product to color (e.g., yellow).

Examples of suitable polyisocyanates can include but are not limited to DESMODUR N 3300 (hexamethylene diisocyanate trimer) and DESMODUR N 3400 (60% hexamethylene diisocyanate dimer and 40% hexamethylene diisocyanate trimer), which are commercially available from Bayer Corporation.

The polyisocyanate can include dicyclohexylmethane diisocyanate and isomeric mixtures thereof. As used herein and the claims, the term "isomeric mixtures" refers to a mixture of the cis-cis, trans-trans, and cis-trans isomers of the polyisocyanate. Non-limiting examples of isomeric mixtures for use in the present invention can include the trans-trans isomer of 4,4'-methylenebis(cyclohexyl isocyanate), hereinafter referred to as "PICM" (paraisocyanato cyclohexylmethane), the cis-trans isomer of PICM, the cis-cis isomer of PICM, and mixtures thereof.

Additional aliphatic and cycloaliphatic diisocyanates that can be used include 3-isocyanato-methyl-3,5,5-trimethyl cyclohexyl-isocyanate ("isophorone diisocyanate" or "IPDI") which is commercially available from Arco Chemical, meta-tetramethylxylylene diisocyanate (1,3-bis(1-isocyanato-1-methylethyl)-benzene) which is commercially available from Cytec Industries Inc. as TMXDI® (Meta) Aliphatic Isocyanate, and m-xylylene diisocyanate (MXDI). Mixtures of any of the foregoing may also be used.

As used herein and the claims, the terms aliphatic and cycloaliphatic diisocyanates refer to 6 to 100 carbon atoms linked in a straight chain or cyclized having two diisocyanate reactive end groups. The aliphatic and cycloaliphatic diisocyanates for use in the present invention can include TMXDI and compounds of the formula R—(NCO)$_2$ wherein R represents an aliphatic group or a cycloaliphatic group.

Further non-limiting examples of suitable polyisocyanates and polyisothiocyanates can include aliphatic polyisocyanates and polyisothiocyanates; ethylenically unsaturated polyisocyanates and polyisothiocyanates; alicyclic polyisocyanates and polyisothiocyanates; aromatic polyisocyanates and polyisothiocyanates wherein the isocyanate groups are not bonded directly to the aromatic ring, e.g., m-xylylene diisocyanate; aromatic polyisocyanates and polyisothiocyanates wherein the isocyanate groups are bonded directly to the aromatic ring, e.g., benzene diisocyanate; aliphatic polyisocyanates and polyisothiocyanates containing sulfide linkages; aromatic polyisocyanates and polyisothiocyanates containing sulfide or disulfide linkages; aromatic polyisocyanates and polyisothiocyanates containing sulfone linkages; sulfonic ester-type polyisocyanates and polyisothiocyanates, e.g., 4-methyl-3-isocyanatobenzenesulfonyl-4'-isocyanato-phenol ester; aromatic sulfonic amide-type polyisocyanates and polyisothiocyanates; sulfur-containing heterocyclic polyisocyanates and polyisothiocyanates, e.g., thiophene-2,5-diisocyanate; halogenated, alkylated, alkoxylated, nitrated, carbodiimide modified, urea modified and biuret modified derivatives of polyisocyanates thereof; and dimerized and trimerized products of polyisocyanates thereof.

In particular embodiments of the present invention, the polyisocyanates can include toluene diisocyanate, 4,4'-diphenylmethane diisocyanate, meta-xylylene diisocyanate, hydrogenated meta-xylylene diisocyanate (1,3-isocyanatomethylcyclohexane), 3-isocyanato-methyl-3,5,5-trimethyl cyclohexyl-isocyanate, hexamethylene diisocyanate, meta-tetramethylxylylene diisocyanate (1,3-bis(1-isocyanato-1-methylethyl)-benzene), and/or 4,4'-methylenebis(cyclohexyl isocyanate).

In certain embodiments the reactive compound (A) comprises a diisocyanate or a mixture of a diisocyanate and a polyisocyanate having more than two isocyanate functional groups. In such a case, the polyisocyanate is present in an amount up to 10 percent by weight of the mixture. In one embodiment, the reactive compound (A) comprises isophorone diisocyanate, meta-tetramethylxylylene diisocyanate (1,3-bis(1-isocyanato-1-methylethyl)-benzene), and/or methylene bis(4-cyclohexyldiisocyanate), available from Bayer Corporation as DESMODUR W.

Non-limiting examples of materials having isocyanate and isothiocyanate groups can include materials having aliphatic, alicyclic, aromatic or heterocyclic groups and which optionally contain sulfur atoms in addition to those of the isothiocyanate groups. Non-limiting examples of such materials can include 1-isocyanato-3-isothiocyanatopropane, 1-isocyanato-5-isothiocyanatopentane, 1-isocyanato-6-isothiocyanatohexane, isocyanatocarbonyl isothiocyanate, 1-isocyanato-4-isothiocyanatocyclohexane, 1-isocyanato-4-isothiocyanatobenzene, 4-methyl-3-isocyanato-1-isothiocyanatobenzene, 2-isocyanato-4,6-diisothiocyanato-1,3,5-triazine, 4-isocyanato-4'-isothiocyanato-diphenyl sulfide and 2-isocyanato-2'-isothiocyanatodiethyl disulfide.

Isocyanate groups may be blocked or unblocked as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate.

The molecular weight of the polyisocyanate and polyisothiocyanate can vary widely. The number average molecular weight (Mn) of each can be at least 100 grams/mole, or at least 150 grams/mole, or less than 15,000 grams/mole, or less than 5000 grams/mole. The number average molecular weight can be determined using known methods. The number average molecular weight values recited herein and the claims were determined by gel permeation chromatography (GPC) using polystyrene standards.

The amount of polyisocyanate compound (A) and the amount of oligomeric polythiol (B), when used to prepare an isocyanate-terminated polyurethane prepolymer or sulfur-containing polyurethane prepolymer, can be selected such that the equivalent ratio of (NCO):(SH+OH) can be greater than 1.0:1.0, or at least 2.0:1.0, or at least 2.5:1.0, or less than 4.5:1.0, or less than 6.5:1.0. Likewise, in the preparation of a prepolymer, amount of polyisothiocyanate used as compound (A) and the amount of oligomeric polythiol (B) can be selected such that the equivalent ratio of (NCS):(SH+OH) can be greater than 1.0:1.0, or at least 2.0:1.0, or at least 2.5:1.0, or less than 4.5:1.0, or less than 6.5:1.0. The amount of a combination of polyisothiocyanate and polyisocyanate used as compound (a) and the amount of oligomeric polythiol (b) in the preparation of a prepolymer can be selected such that the equivalent ratio of (NCS+NCO):(SH+OH) can be greater than 1.0:1.0, or at least 2.0:1.0, or at least 2.5:1.0, or less than 4.5:1.0, or less than 6.5:1.0.

In embodiments wherein the reactive compound (A) comprises polyisothiocyanate and/or polyisocyanate, there is often included in the reaction mixture a thermal stabilizer such as any thermal stabilizers well known in the art. For example, the thermal stabilizer may comprise a phosphite, for example a trisaryl phosphite, in particular, trisnonylphenyl phosphite, added as a stabilizer. The thermal stabilizer may be added to the reaction mixture at any phase of the reaction. For example, the thermal stabilizer may be added during the preparation of the oligomeric polythiol (B) and carried forward to the reaction with the polyisocyanate and/or polyisothiocyanate. Alternatively, the thermal stabilizer may be mixed with the polyisocyanate and/or polyisothiocyanate before reaction with compounds (B) and (C).

Polyepoxides and polyepisulfides are also suitable for use in the reactive compound (A). Examples of suitable polyepoxides include low molecular weight polyepoxides such as 3,4-epoxycyclohexylmethyl 3,4-epoxycyclohexanecarboxylate and bis(3,4-epoxy-6-methylcyclohexyl-methyl) adipate. Higher molecular weight polyepoxides, including polyglycidyl ethers of polyhydric phenols and alcohols, are also suitable.

Other specific examples of polyepoxide materials are disclosed in U.S. Pat. No. 5,369,141; U.S. Pat. No. 5,374,668; and elsewhere. Epoxide-containing materials are often produced by reacting compounds containing active hydrogens with epihalohydrin such as epichlorohydrin or epibromohydrin, using any method known in the art, including but not limited to those procedures disclosed in U.S. Pat. No. 2,324,483 and U.S. Pat. No. 5,807,975. Non-limiting examples of classes of compounds containing active hydrogens that may be chain-extended with an epihalohydrin include compounds having two or more thiol groups, compounds having one or more amino groups, compounds having two or more hydroxyl groups, compounds having combinations of such groups, or mixtures of compounds containing such groups, the Bisphenols, the chlorinated Bisphenols, the brominated Bisphenols, the polyhydric phenols, and the Novolac resins. Epoxide-containing materials may also be produced by reacting ethylenically unsaturated compounds with an appropriate oxidizing agent, such as hydrogen peroxide or meta-chloroperbenzoic acid. Suitable epoxide-containing materials of this type can include but are not limited to the diepoxide derived from 4-vinyl-1-cyclohexene.

Non-limiting examples of aliphatic non-cyclic epoxide-containing materials include the diglycidyl ethers of ethylene glycol, butanediol, diethylene glycol, 1,2-ethanedithiol, and 2-mercaptoethyl sulfide.

Non-limiting examples of epoxide-containing materials containing non-aromatic rings are the poly-epoxides of cyclic polyenes, including but not limited to the bis-epoxide of 4-vinyl-1-cyclohexene.

Non-limiting examples of epoxide-containing materials containing aromatic rings include the polyglycidyl ethers of Bisphenol A, tetrabromo-Bisphenol A, Bisphenol F, Bisphenol S, resorcinol, hydroquinone, and Novolac resin.

Suitable episulfide-containing materials can vary, and can include but are not limited to materials having two or more episulfide functional groups. For example, the episulfide-containing material can have two or more moieties represented by the following graphic formula XV:

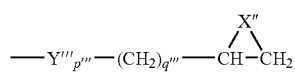

(XV)

wherein X" can be S or O; Y''' can be $C_1$-$C_{10}$ alkyl, O, or S; p''' can be an integer from 0 to 2, and q''' can be an integer from 0 to 10. In a non-limiting embodiment, the numerical ratio of S is 50% or more, on the average, of the total amount of S and O constituting a three-membered ring.

The episulfide-containing material having two or more moieties represented by the formula (VIII) can be attached to an acyclic and/or cyclic skeleton. The acyclic skeleton can be branched or unbranched, and it can contain sulfide and/or ether linkages. The episulfide-containing material can be obtained by replacing the oxygen in an epoxy ring-containing material using sulfur, thiourea, triphenylphosphine sulfide or other such reagents known in the art. Alkylsulfide-type episulfide-containing materials can be obtained by reacting various known polythiols with epichlorohydrin in the presence of an alkali to obtain an alkylsulfide-type epoxy material; and then replacing the oxygen in the epoxy ring as described above.

In alternate non-limiting embodiments, the cyclic skeleton can include the following materials:

(a) an episulfide-containing material wherein the cyclic skeleton can be an alicyclic skeleton, (b) an episulfide-containing material wherein the cyclic skeleton can be an aromatic skeleton, and (c) an episulfide-containing material wherein the cyclic skeleton can be a heterocyclic skeleton including a sulfur atom as a hetero-atom.

Each of the above materials can contain a linkage of a sulfide, an ether, a sulfone, a ketone, and/or an ester.

Non-limiting examples of suitable episulfide-containing materials having an alicyclic skeleton can include 1,3- and 1,4-bis(β-epithiopropylthio)cyclohexane, 1,3- and 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 4-vinyl-1-cyclohexene diepisulfide, 4-epithioethyl-1-cyclohexene sulfide, 4-epoxy-1,2-cyclohexene sulfide, 2,5-bis(β-epithiopropylthio)-1,4-dithiane, and 2,5-bis(β-epithiopropylthioethylthiomethyl)-1,4-dithiane.

Non-limiting examples of suitable episulfide-containing materials having an aromatic skeleton can include 1,3- and 1,4-bis(β-epithiopropylthio)benzene, 1,3- and 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone, and 4,4-bis(β-epithiopropylthio)biphenyl.

Non-limiting examples of suitable episulfide-containing materials having a heterocyclic skeleton including the sulfur atom as the hetero-atom can include the materials represented by the following general formulas:

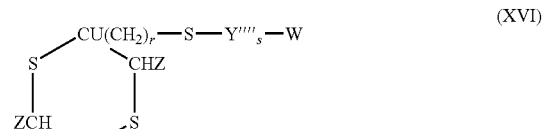

(XVI)

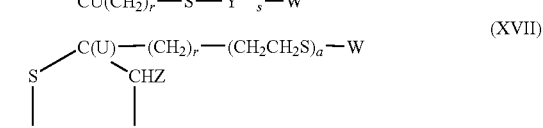

(XVII)

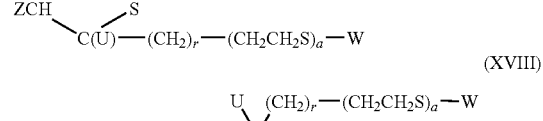

(XVIII)

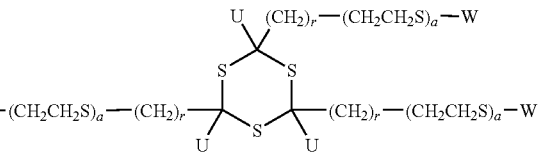

wherein r can be an integer from 1 to 5; s can be an integer from 0 to 4; a can be an integer from 0 to 5; U can be a hydrogen atom or an alkyl group having 1 to 5 carbon atoms; Y'''' can be —($CH_2CH_2S$)—; Z can be chosen from a hydrogen atom, an alkyl group having 1 to 5 carbon atoms or —($CH_2$)$_r$SY''''$_s$W; W can be an epithiopropyl group represented by the following graphic formula XIX:

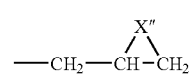

(XIX)

wherein X" can be O or S.

Additional non-limiting examples of suitable episulfide-containing materials can include 2,5-bis(β-epithiopropylthiomethyl)-1,4-dithiane; 2,5-bis(β-epithiopropylthioethylthiomethyl)-1,4-dithiane; 2,5-bis(β-epithiopropylthioethyl)-1,4-dithiane; 2,3,5-tri(β-epithiopropylthioethyl)-1,4-dithiane; 2,4,6-tris(β-epithiopropylthiomethyl)-1,3,5-trithiane; 2,4,6-tris(β-epithiopropylthioethyl)-1,3,5-trithiane; 2,4,6-tris(β-epithiopropylthiomethyl)-1,3,5-trithiane; 2,4,6-tris(β-epithiopropylthioethylthioethyl)-1,3,5-trithiane; such as the materials represented by graphic formulae XX, XXI, XXII and XXIII:

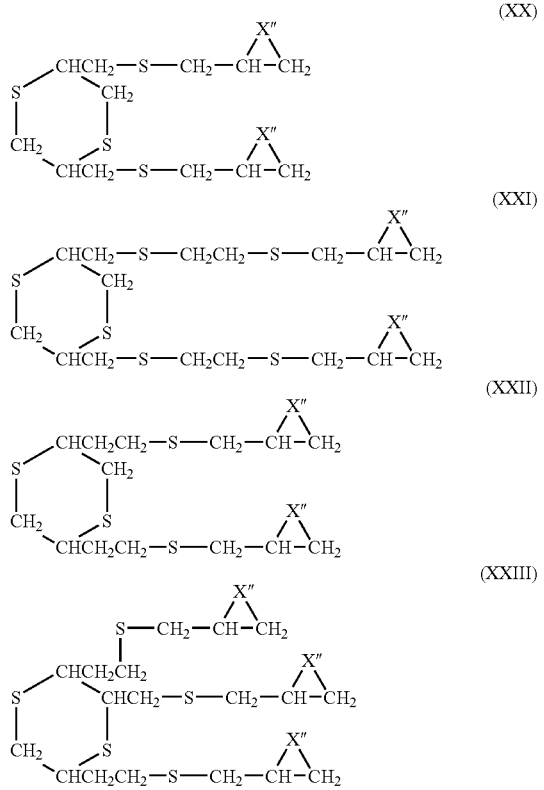

wherein X" can be as defined above.

Polyacids, particularly polycarboxylic acids, are also suitable for use in the reactive compound (A). Non-limiting examples of unsaturated polycarboxylic acids, e.g., dicarboxylic acids, include maleic, fumaric, citraconic, itaconic and meconic acids, their anhydrides and their lower alkyl esters or acid halides. Non-limiting examples of saturated polycarboxylic acids include aliphatic dicarboxylic acids such as malonic, succinic, glutaric, adipic, suberic, azelaic, pimelic and sebacic acids; aromatic acids such as orthophthalic, terephthalic, isophthalic acids and the anhydrides of such aromatic acids, such as phthalic anhydride and maleic anhydride, and the lower alkyl esters or acid halides of these acids or mixtures thereof. Non-limiting examples of suitable cyclic anhydrides include tetrahydrophthalic anhydride, hexahydrophthalic anhydride, methyl hexahydrophthalic anhydride, maleic anhydride adduct of cyclopentadiene, maleic anhydride adduct of methylcyclopentadiene, chlorendic anhydride, pyromellitic dianhydride, and others disclosed in U.S. Pat. No. 5,369,141.

Mixtures of acids and/or anhydrides may also be used.

Polyethylenically unsaturated reactive compounds; i.e., materials having multiple ethylenically unsaturated groups (double bonds), are particularly useful in compositions that cure using actinic radiation; e.g., UV curable compositions. Any of the materials disclosed above having at least two double bonds is suitable. Polyvinyl ethers are examples of suitable reactive compounds. Poly(meth)acrylate reactive compounds include ethylene glycol di(meth)acrylate, tetraethylene glycol di(meth)acrylate, glycerol di(meth)acrylate, glycerol tri(meth)acrylate, 1,3-propylene glycol di(meth)acrylate, dipropylene glycol di(meth)acrylate, 1,4-butanediol di(meth)acrylate, 1,2,4-butanetriol tri(meth)acrylate, 1,6-hexanediol di(meth)acrylate, 1,4-cyclohexanediol di(meth)acrylate, 1,4-benzenediol di(meth)acrylate, pentaerythritol tetra(meth)acrylate, 1,5-pentanediol di(meth)acrylate, trimethylolpropane di(meth)acrylate, and trimethylolpropane tri(meth)acrylate.

The compound (C) containing active hydrogens (which is different from B), used to prepare the compositions and articles of the present invention, may be any compound or mixture of compounds that contain active hydrogens (e.g., active hydrogens of hydroxyl, thiol or amino groups). The compound (C) may comprise a compound having at least two active hydrogens comprising primary amine groups, secondary amine groups, hydroxyl groups, thiol groups, and/or combinations thereof. A single polyfunctional compound having a single type of functional group may be used; likewise, a single polyfunctional compound having mixed functional groups (e.g. hydroxyl and amino groups) may be used. Several different compounds may be used in admixture having the same or different functional groups; e.g., two different polyamines may be used, polythiols mixed with polyamines may be used, or polyamines mixed with hydroxyl functional polythiols, for example, are suitable.

The compound (C) may have at least two primary and/or secondary amine groups (polyamine). Non-limiting examples of suitable polyamines include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Non-limiting examples of suitable aliphatic and alicyclic diamines include 1,2-ethylene diamine, 1,2-propylene diamine, 1,8-octane diamine, isophorone diamine, propane-2,2-cyclohexyl amine, and the like. Non-limiting examples of suitable aromatic diamines include phenylene diamines and toluene diamines, for example o-phenylene diamine and p-tolylene diamine. Polynuclear aromatic diamines such as 4,4'-biphenyl diamine, 4,4'-methylene dianiline and monochloro- and dichloro-derivatives of 4,4'-methylene dianiline are also suitable.

Suitable polyamines for use in the present invention can include but are not limited to materials having the following graphic formula XXIV:

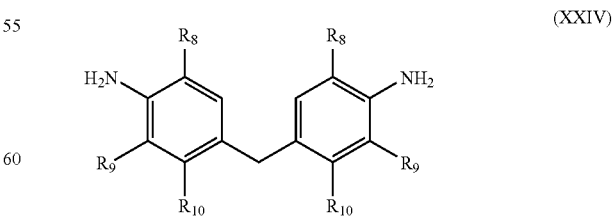

wherein $R_8$ and $R_9$ can each be independently chosen from methyl, ethyl, propyl, and isopropyl groups, and $R_{10}$ can be chosen from hydrogen and chlorine. Non-limiting examples of polyamines for use in the present invention include the following compounds, manufactured by Lonza Ltd. (Basel, Switzerland):

LONZACURE® M-DIPA: $R_8=C_3H_7$; $R_9=C_3H_7$; $R_{10}=H$

LONZACURE® M-DMA: $R_8=CH_3$; $R_9=CH_3$; $R_{10}=H$

LONZACURE® M-MEA: $R_8=CH_3$; $R_9=C_2H_5$; $R_{10}=H$

LONZACURE® M-DEA: $R_8=C_2H_5$; $R_9=C_2H_5$; $R_{10}=H$

LONZACURE® M-MIPA: $R_8=CH_3$; $R_9=C_3H_7$; $R_{10}=H$

LONZACURE® M-CDEA: $R_8=C_2H_5$; $R_9=C_2H_5$; $R_{10}=Cl$ wherein $R_8$, $R_9$ and $R_{10}$ correspond to the aforementioned chemical formula.

The polyamine can include a diamine reactive compound such as 4,4'-methylenebis(3-chloro-2,6-diethylaniline), (Lonzacure® M-CDEA), which is available in the United States from Air Products and Chemical, Inc. (Allentown, Pa.); 2,4-diamino-3,5-diethyl-toluene, 2,6-diamino-3,5-diethyl-toluene and mixtures thereof (collectively "diethyltoluenediamine" or "DETDA"), which is commercially available from Albemarle Corporation under the trade name Ethacure 100; dimethylthiotoluenediamine (DMTDA), which is commercially available from Albemarle Corporation under the trade name Ethacure 300; 4,4'-methylene-bis-(2-chloroaniline) which is commercially available from Kingyorker Chemicals as MOCA. DETDA can be a liquid at room temperature with a viscosity of 156 cPs at 25° C. DETDA can be isomeric, with the 2,4-isomer range being from 75 to 81 percent while the 2,6-isomer range can be from 18 to 24 percent. The color stabilized version of Ethacure 100 (i.e., formulation which contains an additive to reduce yellow color), which is available under the name Ethacure 100 S may be used in the present invention.

Other examples of the polyamine can include ethyleneamines. Suitable ethyleneamines can include but are not limited to ethylenediamine (EDA), diethylenetriamine (DETA), triethylenetetramine (TETA), tetraethylenepentamine (TEPA), pentaethylenehexamine (PEHA), piperazine, morpholine, substituted morpholine, piperidine, substituted piperidine, diethylenediamine (DEDA), and 2-amino-1-ethylpiperazine. In particular embodiments, the polyamine can be chosen from one or more isomers of $C_1$-$C_3$ dialkyl toluenediamine, such as but not limited to 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine, and mixtures thereof. Methylene dianiline and trimethyleneglycol di(para-aminobenzoate) are also suitable.

Additional examples of suitable polyamines include methylene bis anilines, aniline sulfides, and bianilines, any of which may be hetero-substituted, provided the substituents do not interfere with any reactions to take place among the reactants. Specific examples include 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline) and 4,4'-methylene-bis(2,6-diethyl-3-chloroaniline).

Diamino toluenes such as diethyl toluene diamine (DETDA) are also suitable.

In certain embodiments when the reactive compound (A) comprises isocyanate functionality, the amounts of (A), (B), and (C) can be selected such that the equivalent ratio of (NH+SH+OH):(NCO) can range from 0.80:1.0 to 1.1:1.0, or from 0.85:1.0 to 1.0:1.0, or from 0.90:1.0 to 1.0:1.0, or from 0.90:1.0 to 0.95:1.0, or from 0.95:1.0 to 1.0:1.0.

In embodiments wherein the reactive compound (A) comprises polyisocyanate and/or polyisothiocyanate, the amounts of (A), (B), and (C) can be selected such that the equivalent ratio of (NH+SH+OH):(NCO+NCS) can range from 0.80:1.0 to 1.1:1.0, or from 0.85:1.0 to 1.0:1.0, or from 0.90:1.0 to 1.0:1.0, or from 0.90:1.0 to 0.95:1.0, or from 0.95:1.0 to 1.0:1.0.

The active hydrogen-containing compound (C) may have at least two primary and/or secondary hydroxyl groups (polyol). Suitable polyols include diols such as glycols and higher polyols. Hydroxyl functional polyesters as are known to those skilled in the art are also suitable for use as the compound (C). In alternate non-limiting embodiments, the active hydrogen-containing material for use in the present invention can be chosen from polyether glycols and polyester glycols having a number average molecular weight of at least 200 grams/mole, or at least 300 grams/mole, or at least 750 grams/mole; or no greater than 1,500 grams/mole, or no greater than 2,500 grams/mole, or no greater than 4,000 grams/mole.

Any of the polythiols disclosed above, including the polythiols with hydroxyl functionality, are suitable for use as the compound (C).

Reaction of the various compounds (A), (B), and (C) may be enhanced with the use of catalysts as can be determined by those skilled in the art. Suitable catalysts can be selected from those known in the art. Non-limiting examples can include tertiary amine catalysts, organophosphorus compounds, tin compounds, or mixtures thereof, depending on the nature of the various reactive components. In alternate embodiments, the catalysts can comprise dimethyl cyclohexylamine or dibutyl tin dilaurate or mixtures thereof. Degassing can take place prior to or following addition of catalyst.

When the reactive compound (A) comprises a polyisocyanate, a urethanation catalyst can be used in the present invention to enhance the reaction of the polyurethane-forming materials. Suitable urethanation catalysts can vary; for example, suitable urethanation catalysts can include those catalysts that are useful for the formation of urethane by reaction of the NCO and OH-containing materials and/or the reaction of the NCO and SH-containing materials. Non-limiting examples of suitable catalysts can be chosen from the group of Lewis bases, Lewis acids and insertion catalysts as described in Ullmann's Encyclopedia of Industrial Chemistry, $5^{th}$ Edition, 1992, Volume A21, pp. 673 to 674. The catalyst can be a stannous salt of an organic acid, such as but not limited to stannous octoate, dibutyl tin dilaurate, dibutyl tin diacetate, dibutyl tin mercaptide, dibutyl tin dimaleate, dimethyl tin diacetate, dimethyl tin dilaurate, dibutyltin dichloride, 1,4-diazabicyclo[2.2.2]octane, and mixtures thereof. The catalyst can alternately be zinc octoate, bismuth, or ferric acetylacetonate.

Further non-limiting examples of suitable catalysts can include tin compounds such as dibutyl tin dilaurate, phosphines, tertiary ammonium salts and tertiary amines such as but not limited to triethylamine, triisopropylamine, dimethyl cyclohexylamine, N,N-dimethylbenzylamine and mixtures thereof. Such suitable tertiary amines are disclosed in U.S. Pat. No. 5,693,738 at column 10, lines 6-38, the disclosure of which is incorporated herein by reference.

When employed, the catalyst level can vary widely and can be dependent upon a variety of factors such as the type and amounts of the reactive compounds used to prepare the compositions and articles of the present invention, as well as reaction conditions, speed of reaction, and degree of reaction desired.

In an embodiment of the present invention wherein the optical article is a lens, the mixture, which can be optionally degassed, can be introduced into a mold and the mold can be heated (i.e., using a thermal cure cycle) using a variety of conventional techniques known in the art. The thermal cure cycle can vary depending on the reactivity and molar ratio of the reactants, and the presence of catalyst(s). In particular embodiments, thermal cure cycle can include heating a mixture of a polyurethane prepolymer (reaction product of (A) and (B)) and an amine-containing curing agent compound (C), wherein the curing agent can include primary diamine or a mixture of primary diamine and trifunctional or higher functional polyamine and optionally polyol and/or polythiol and/or polythiol oligomer; or heating the mixture of polyisocyanate and/or polyisothiocyanate, polyol and/or polythiol and/or oligomeric polythiol, and amine-containing material; from room temperature to a temperature of 200° C. over a period of from 0.5 hours to 120 hours; or from 80 to 150° C. for a period of from 5 hours to 72 hours.

The present invention is further drawn to rigid articles, such as optical articles, comprising a reaction product of:

(A) a material having functional groups that are reactive with active hydrogens;

(B) a thioether-functional, oligomeric polythiol prepared by reacting together:
  (1) a compound having at least two thiol functional groups; and
  (2) a compound having triple bond functionality; and optionally (C) a compound different from (B) containing active hydrogens.

Such articles may be prepared using any of the previously mentioned components for (A), (B) and (C), as described above to have any of the physical properties previously mentioned.

In accordance with the present invention, there is also provided an article of manufacture, comprising a reaction product of:

(A) a reactive compound comprising a material having functional groups that are reactive with active hydrogens;

(B) a thioether-functional, oligomeric polythiol prepared by reacting together:
  (1) a compound having at least two thiol functional groups;
  (2) a compound having triple bond functionality; and optionally
  (3) a compound having at least two double bonds; and, optionally, (C) a compound different from (B) containing active hydrogens.

Any of the materials disclosed above for (A), (B) and (C) may be used to prepare the articles of manufacture of the present invention. Such articles may include films, coatings, and molded items such as optical articles, in accordance with the present invention.

In a particular non-limiting embodiment of the present invention, a reaction product comprising a sulfur-containing polyurethane can be prepared as follows:

1. A sulfur-containing polyurethane prepolymer is prepared by the reaction of:
   A) at least one material comprising polyisocyanates, polyisothiocyanates, or mixtures thereof;
   B) at least one polythiol comprising from any of the oligomeric polythiols of the present invention; and
   C) optionally, other active hydrogen-containing material, comprising polyols, polythiols, or mixtures thereof.

2. Said sulfur-containing polyurethane prepolymer is mixed with at least one material containing episulfide groups, epoxide groups, or mixtures of such groups.

3. Sulfur-containing polyurethane is then prepared by the reaction of:
   a) the product from step 2 above, and
   b) at least one active hydrogen-containing material, comprising polyols, polythiols, or mixtures thereof.

In another particular non-limiting embodiment of the present invention, a reaction product comprising a sulfur-containing polyurethaneurea can be prepared as follows:

1. A sulfur-containing polyurethane prepolymer is prepared by the reaction of:
   A) at least one material comprising polyisocyanates, polyisothiocyanates, or mixtures thereof;
   B) at least one polythiol comprising any of the oligomeric polythiols of the present invention;
   C) optionally, other active hydrogen-containing material, comprising polyols, polythiols, or mixtures thereof.

2. Said sulfur-containing polyurethane prepolymer is mixed with at least one material containing episulfide groups, epoxide groups, or mixtures of such groups.

3. Sulfur-containing polyurethaneurea is then prepared by the reaction of:
   a) the product from step 2 above;
   b) a compound having at least two amine groups; and
   c) optionally, active hydrogen-containing material, comprising polyols, polythiols, or mixtures thereof.

In alternate non-limiting embodiments, various known additives can be incorporated into the articles of the present invention. Such additives can include but are not limited to light stabilizers, heat stabilizers, antioxidants, ultraviolet light absorbers, mold release agents, static (non-photochromic) dyes, pigments and flexibilizing additives, such as but not limited to alkoxylated phenol benzoates and poly(alkylene glycol) dibenzoates. Non-limiting examples of anti-yellowing additives can include 3-methyl-2-butenol, organo pyrocarbonates and triphenyl phosphite (CAS registry no. 101-02-0). Such additives can be present in an amount such that the additive constitutes less than 10 percent by weight, or less than 5 percent by weight, or less than 3 percent by weight, based on the total weight of the reaction product. The aforementioned optional additives can be mixed with a polyisocyanate and/or polyisothiocyanate. Alternatively, the optional additives can be mixed with active hydrogen-containing material.

In certain embodiments, the articles of the present invention may further comprise a material to provide a light influencing property. Such a material may be inorganic or organic and may be present in the substrate, and/or in a superposed coating or film as described below.

A wide variety of polarizing and/or photochromic materials may be used in the article, e.g. the optical article, of the present invention to provide a light influencing property. The photochromic materials may be provided in a variety of forms. Examples include: a single photochromic compound; a mixture of photochromic compounds; a material containing a photochromic compound, such as a monomeric or polymeric ungelled solution; a material such as a monomer or polymer to which a photochromic compound is chemically bonded; a material comprising and/or having chemically bonded to it a photochromic compound, the outer surface of the material being encapsulated (encapsulation is a form of coating), for example with a polymeric resin or a protective coating such as a metal oxide that prevents contact of the photochromic material with external materials such as oxygen, moisture and/or chemicals that have a negative effect on the photochromic material; such materials can be formed into a particulate prior to applying the protective coating as described in U.S. Pat. Nos. 4,166,043 and 4,367,170; a photochromic polymer, e.g., a photochromic polymer comprising photochromic compounds bonded together; or mixtures thereof.

The inorganic photochromic material may contain crystallites of silver halide, cadmium halide and/or copper halide. Other inorganic photochromic materials may be prepared by the addition of europium (II) and/or cerium (III) to a mineral glass such as a soda-silica glass.

The photochromic material may be an organic photochromic material having an activated absorption maxima in the range from 300 to 1000 nanometers. In one embodiment, the organic photochromic material comprises a mixture of (a) an organic photochromic material having a visible lambda max of from 400 to less than 550 nanometers, and (b) an organic photochromic material having a visible lambda max of from 550 to 700 nanometers.

The photochromic material may alternatively comprise an organic photochromic material that may be chosen from pyrans, oxazines, fulgides, fulgimides, diarylethenes and mixtures thereof.

Non-limiting examples of photochromic pyrans that may be used herein include benzopyrans, and naphthopyrans, e.g., naphtho[1,2-b]pyrans, naphtho[2,1-b]pyrans, indeno-fused naphthopyrans and heterocyclic-fused naphthopyrans, spiro-9-fluoreno[1,2-b]pyrans, phenanthropyrans, quinolinopyrans; fluoroanthenopyrans and spiropyrans, e.g., spiro(benzindoline)naphthopyrans, spiro(indoline)benzopyrans, spiro(indoline)naphthopyrans, spiro(indoline)quinolinopyrans and spiro(indoline)pyrans and mixtures thereof. Non-limiting examples of benzopyrans and naphthopyrans are disclosed in U.S. Pat. No. 5,645,767 at column 2, line 16 to column 12, line 57; U.S. Pat. No. 5,723,072 at column 2, line 27 to column 15, line 55; U.S. Pat. No. 5,698,141 at column 2, line 11 to column 19, line 45; U.S. Pat. No. 6,022,497 at column 2, line 21 to column 11, line 46; U.S. Pat. No. 6,080,338 at column 2, line 21 to column 14, line 43; U.S. Pat. No. 6,136,968 at column 2, line 43 to column 20, line 67; U.S. Pat. No. 6,153,126 at column 2, line 26 to column 8, line 60; U.S. Pat. No. 6,296,785 at column 2, line 47 to column 31, line 5; U.S. Pat. No. 6,348,604 at column 3, line 26 to column 17, line 15; U.S. Pat. No. 6,353,102 at column 1, line 62 to column 11, line 64; U.S. Pat. No. 6,630,597 at column 2, line 16 to column 16, line 23; and U.S. Pat. No. 6,736,998 at column 2, line 53 to column 19, line 7, the cited portions of which are incorporated herein by reference. Further non-limiting examples of naphthopyrans and complementary organic photochromic substances are described in U.S. Pat. No. 5,658,501 at column 1, line 64 to column 13, line 17, which disclosure is incorporated herein by reference. Spiro(indoline)pyrans are also described in the text, *Techniques in Chemistry*, Volume III, "Photochromism", Chapter 3, Glenn H. Brown, Editor, John Wiley and Sons, Inc., New York, 1971.

Examples of photochromic oxazines that may be used include benzoxazines, naphthoxazines, and spiro-oxazines, e.g., spiro(indoline)naphthoxazines, spiro(indoline)pyridobenzoxazines, spiro(benzindoline)pyridobenzoxazines, spiro(benzindoline)naphthoxazines, spiro(indoline)benzoxazines, spiro(indoline)fluoranthenoxazine, spiro(indoline)quinoxazine and mixtures thereof.

Examples of photochromic fulgides or fulgimides that may be used include: fulgides and fulgimides, which are disclosed in U.S. Pat. No. 4,685,783 at column 1, line 57 to column 5, line 27, and in U.S. Pat. No. 4,931,220 at column 1, line 39 through column 22, line 41, the disclosure of such fulgides and fulgimides are incorporated herein by reference. Non-limiting examples of diarylethenes are disclosed in U.S. Patent Application 2003/0174560 paragraphs [0025] to [0086].

Polymerizable organic photochromic materials, such as polymerizable naphthoxazines disclosed in U.S. Pat. No. 5,166,345 at column 3, line 36 to column 14, line 3; polymerizable spirobenzopyrans disclosed in U.S. Pat. No. 5,236,958 at column 1, line 45 to column 6, line 65; polymerizable spirobenzopyrans and spirobenzothiopyrans disclosed in U.S. Pat. No. 5,252,742 at column 1, line 45 to column 6, line 65; polymerizable fulgides disclosed in U.S. Pat. No. 5,359,085 at column 5, line 25 to column 19, line 55; polymerizable naphthacenediones disclosed in U.S. Pat. No. 5,488,119 at column 1, line 29 to column 7, line 65; polymerizable spirooxazines disclosed in U.S. Pat. No. 5,821,287 at column 3, line 5 to column 11, line 39; polymerizable polyalkoxylated naphthopyrans disclosed in U.S. Pat. No. 6,113,814 at column 2, line 23 to column 23, line 29; and the polymeric matrix compatibilized naphthopyran of U.S. Pat. No. 6,555,028 at column 2, line 40 to column 24, line 56 may be used. The disclosures of the aforementioned patents on polymerizable organic photochromic materials are incorporated herein by reference.

The photochromic materials can be incorporated into the article e.g. the optical article, by various means. For example, the photochromic materials may be incorporated, e.g., dissolved and/or dispersed, into the composition, or polymerized with other components of the composition. Alternatively, the photochromic materials may be incorporated into the composition by imbibition, permeation or other transfer methods as known by those skilled in the art.

Typically the photochromic material is present in the article in a photochromic amount; that is, in an amount yielding a color change distinguishable by the naked eye upon exposure to radiation. The amount of photochromic material incorporated into the curable film-forming composition may range from 0.5 to 40 weight percent based on the weight of the solids in the curable film-forming composition. The amount of photochromic material may range from 1 to 30 weight percent, from 3 to 20 weight percent, or from 3 to 10 weight percent. The amount of photochromic material in the optical article may range between any combination of these values, inclusive of the recited range.

The article of the present invention may further comprise an at least partial film or coating superposed thereon. Such a coating or film may comprise, inter alia, a photochromic coating, tint coating, polarizing coating, and/or an abrasion resistant or other protective coating.

The types of material used for the film or coating may vary widely and be chosen from the polymeric organic materials of the substrate and the protective films described hereinafter. Moreover, the film or coating may comprise the previously mentioned reaction products comprising thioether functional, oligomeric polythiols. The thickness of the films of polymeric organic materials may vary widely. The thickness may range, for example, from 0.1 mil to 40 mils and any range of thicknesses between these values, inclusive of the recited values. However, if desired, greater thicknesses may be used.

The polymeric organic materials may be chosen from thermosetting materials, thermoplastic materials and mixtures thereof. Examples of films of polymeric organic materials are disclosed in U.S. Patent Publication 2004/0096666 in paragraphs [0082] to [0098] which disclosure of such polymeric films is incorporated herein by reference.

In certain embodiments, the film or coating comprises thermoplastic polymeric organic materials such as nylon, poly(vinyl acetate), vinyl chloride-vinyl acetate copolymer, poly($C_1$-$C_8$ alkyl)acrylates, poly($C_1$-$C_8$ alkyl)methacrylates, styrene-butadiene copolymer resin, poly(urea-urethanes), polyurethanes, polyterephthalates, polycarbonates, polycarbonate-silicone copolymer and mixtures thereof.

Optionally, compatible (chemically and color-wise) fixed tint dyes may be added or applied to the optical article and/or superposed films to achieve a more aesthetic result, for medical reasons, or for reasons of fashion. For example, the dye may be selected to complement the color resulting from activated photochromic materials, e.g., to achieve a more neutral color or absorb a particular wavelength of incident light. In another embodiment, the dye may be selected to provide a desired hue to the host material when the photochromic materials are in an unactivated state.

Often, a protective film can be applied to the article surface e.g., to prevent scratches from the effects of friction and abrasion. The protective film connected to the optical article of the present invention is typically an at least partially abrasion resistant film. The phrase "an at least partially abrasion resistant film" refers to an at least partial film of an at least partially cured coating or sheet of a protective polymeric material that demonstrates a resistance to abrasion that is greater than the standard reference material, typically a plastic made of CR-39® monomer available from PPG Industries, Inc, as tested in a method comparable to ASTM F-735 Standard Test Method for Abrasion Resistance of Transparent Plastics and Coatings Using the Oscillating Sand Method.

The protective film may be chosen from protective sheet materials, protective gradient films (which also provide a gradient in hardness for the films between which they are interposed), protective coatings and combinations thereof. Protective coatings such as hardcoats may be applied onto the surface of the polymeric film, the substrate and/or any applied films, e.g., superjacent to protective transitional films.

When the protective film is chosen from protective sheet materials, it may be chosen, for example, from the protective polymeric sheet materials disclosed in paragraphs [0118] to [0126] of U.S. Patent Publication 2004/0096666, incorporated herein by reference. Also the protective film can comprise film or sheet materials comprising the any of the previously mentioned reaction products comprising any of the thioether functional, oligomeric polythiols of the present invention.

The protective gradient films provide an at least partially abrasion resistant film and may be subsequently coated with another protective film. The protective gradient film may serve to protect the article during shipping or subsequent handling prior to the application of the additional protective film. After application of an additional protective film, the protective gradient film provides a gradient in hardness from one applied film to another. The hardness of such films may be determined by methods known to those skilled in the art. The protective film may also be superjacent to a protective gradient film. Non-limiting examples of protective films providing such gradient properties include the radiation cured (meth) acrylate-based coatings described in U.S. Patent Application Publication 2003/0165686 in paragraphs to [0023] and [0079] to [0173], incorporated herein by reference.

The protective films may also include protective coatings. Examples of protective coatings known in the art that provide abrasion and scratch resistance are chosen from polyfunctional acrylic hard coatings, melamine-based hard coatings, urethane-based hard coatings, alkyd-based coatings and organosilane type coatings. Non-limiting examples of such abrasion resistant coatings are disclosed in U.S. Patent Application 2004/0096666 in paragraphs [0128] to [0149], and in U.S. Patent Application 2004/0207809 in paragraphs [0205] to [0249], both disclosures incorporated herein by reference.

The optical article of the present invention may optionally further comprise an at least partially polarizing surface treatment, coating, or film. The phrase "at least partially polarizing" means that from some to all of the vibrations of the electric field vector of lightwaves is confined to one direction or plane by the surface treatment. Such polarizing effects may be achieved by applying to the optical element a film having an aligned dichroic material to at least partially polarize transmitted radiation. In one non-limiting embodiment, a polymeric sheet is stretched to align the dichroic material applied to the polymeric sheet. In another non-limiting embodiment, a coating is cured in a directional fashion, e.g., using polarized ultraviolet radiation, to align the dichroic materials in the coating.

The optical article may further comprise an at least partially antireflective surface treatment. The phrase "an at least partially antireflective surface" treatment means that there is an at least partial improvement in the antireflective nature of the optical element to which it is applied. In non-limiting embodiments, there may be a reduction in the amount of glare reflected by the surface of the treated optical element and/or an increase in the percent transmittance through the treated optical element as compared to an untreated optical element.

In other non-limiting embodiments, an at least partially antireflective surface treatment, e.g., a monolayer or multilayer of metal oxides, metal fluorides, or other such materials, can be connected to the surface of the optical article, e.g., lenses, of the present invention through vacuum evaporation, sputtering, or some other method.

The optical article of the present invention may further comprise an at least partially hydrophobic surface treatment. The phrase "an at least partially hydrophobic surface" is a film that at least partially improves the water repellent nature of the substrate to which it is applied by reducing the amount of water from the surface that can adhere to the substrate as compared to an untreated substrate.

When the optical article is a lens, the mixture of reactants can be introduced into a mold and the mold can be heated using a variety of conventional techniques known in the art. The thermal cure cycle can vary depending on, for example, the reactivity and molar ratio of the reactants and the presence of catalyst(s). In one example, the thermal cure cycle can include heating the reactants from room temperature to 200° C. over a period of from 0.5 hours to 72 hours.

The present invention is more particularly described in the following examples that are intended as illustration only, since numerous modifications and variations therein will be apparent to those skilled in the art, without departing from the spirit and scope of the invention.

EXAMPLES

In the following examples, unless otherwise stated, the refractive index reported as D-line (nD) and/or E-line (nE) and Abbe number were measured on a multiple wavelength Abbe Refractometer Model DR-M2 manufactured by ATAGO Co., Ltd.; the refractive index and Abbe number of liquids were measured in accordance with ASTM-D1218; the refractive index and Abbe number of solids was measured in accordance with ASTM-D-542.

The viscosity was measured using a Brookfield CAP 2000+ Viscometer.

Hardness was measured in accordance with ISO standard test method BS EN ISO 14577-1:2002, using a Fischer Scope H-100 instrument, supplied by Fischer Technology, Inc., and was reported as Martens Hardness (HM 0.3/15/0), in the units of Newtons (N)/mm$^2$. As required in said standard test method, the following test parameters were specified: Maximum Total Load applied to sample was 0.3 Newtons (N), time period over which Maximum Total Load was applied to sample was 15 seconds, and the time of duration for which said Maximum Total Load was then applied to sample was 0 seconds. Therefore, the test results were designated with the term "HM 0.3/15/0" in order to reflect these three test parameters.

Impact testing was accomplished in accordance with the Impact Energy Test, as described herein, and the results are reported in energy units (Joules). The Impact Energy Test consists of testing a flat sheet sample of polymerizate having a thickness of 3 mm, and cut into a square piece approximately 4 cm×4 cm. Said flat sheet sample of polymerizate is supported on a flat O-ring which is attached to top of the pedestal of a steel holder, as defined below. Said O-ring is constructed of neoprene having a hardness of 40±5 Shore A durometer, a minimum tensile strength of 8.3 MPa, and a minimum ultimate elongation of 400 percent, and has an inner diameter of 25 mm, an outer diameter of 31 mm, and a thickness of 2.3 mm. Said steel holder consists of a steel base, with a mass of approximately 12 kg, and a steel pedestal affixed to said steel base. The shape of said steel pedestal is approximated by the solid shape which would result from adjoining onto the top of a cylinder, having an outer diameter of 75 mm and a height of 10 mm, the frustum of a right circular cone, having a bottom diameter of 75 mm, a top diameter of 25 mm, and a height of 8 mm, wherein the center of said frustum coincides with the center of said cylinder. The bottom of said steel pedestal is affixed to said steel base, and the neoprene O-ring is centered and affixed to the top of the steel pedestal. The flat sheet sample of polymerizate is centered and set on top of the O-ring. The Impact Energy Test is carried out by dropping steel balls of increasing weight from a distance of 50 inches (1.27 meters) onto the center of the flat sheet sample. The sheet is determined to have passed the test if the sheet does not fracture. The sheet is determined to have failed the test when the sheet fractures. As used herein, the term "fracture" refers to a crack through the entire thickness of the sheet into two or more separate pieces, or detachment of one or more pieces of material from the backside of the sheet (i.e., the side of the sheet opposite the side of impact). The impact strength of the sheet is reported as the impact energy that corresponds to the highest level (i.e., largest ball) at which the sheet passes the test, and it is calculated according to the following formula:

E=mgd wherein E represent impact energy in Joules (J), m represents mass of the ball in kilograms (kg), g represents acceleration due to gravity (i.e., 9.80665 m/sec$^2$) and d represents the distance of the ball drop in meters (i.e., 1.27 m).

The NCO concentration of the prepolymer (Component A) was determined by reaction with an excess of n-dibutylamine (DBA) to form the corresponding urea followed by titration of the unreacted DBA with HCl in accordance with the following procedure.

Reagents
1. Tetrahydrofuran (THF), reagent grade.
2. 80/20 THF/propylene glycol (PG) mix.
   This solution was prepared in-lab by mixing 800 mls PG with 3.2 liters of THF in a 4-liter bottle.
3. DBA, dibutylamine certified ACS.
4. DBA/THF solution. 150 mL of DBA was combined with 750 mL of THF; it was mixed well and transferred to an amber bottle.
5. Hydrochloric acid, concentrated. ACS certified.
6. Isopropanol, technical grade.
7. Alcoholic hydrochloric acid, 0.2N. 75 ml of conc. HCl was slowly added to a 4-liter
   bottle of technical grade isopropanol
   while stirring with a magnetic stirrer; it was mixed for a minimum of 30 minutes. This solution was standardized using THAM
   (Tris hydroxylmethyl amino methane) as follows: Into a glass 100-mL beaker, was weighed approximately 0.6 g (HOCH$_2$)$_3$CNH$_2$ primary standard to the nearest 0.1 mg and the weight was recorded. 100 mL DI water was added and mixed to dissolve and titrated with the prepared alcoholic HCl.
   This procedure was repeated a minimum of one time and the values were averaged using the calculation below.

$$\text{Normality HCL} = \frac{\text{(Standard wt., grams)}}{\text{(mLs HCl)}(0.12114)}$$

Equipment
1. Polyethylene beakers, 200-mL, Falcon specimen beakers, No. 354020.
2. Polyethylene lids for above, Falcon No. 354017.
3. Magnetic stirrer and stirring bars.
4. Brinkmann dosimeter for dispensing or 10-mL pipette.
5. Autotitrator equipped with pH electrode.
6. 25-mL, 50-mL dispensers for solvents or 25-mL and 50-mL pipettes.

Procedure
1. Blank determination: Into a 220-mL polyethylene beaker was added 50 mL THF followed by 10.0 mL DBA/THF solution.
   The solution was capped and mixed with magnetic stirring for 5 minutes. 50 mL of the 80/20 THF/PG mix was added and titrated using the standardized alcoholic HCl solution and this volume was recorded. This procedure was repeated and these values averaged for use as the blank value.
2. In a polyethylene beaker was weighed 1.0 gram of prepolymer sample and the weight was recorded to the nearest 0.1 mg. 50 mL THF was added, the sample was capped and allowed to dissolve with magnetic stirring.
3. 10.0 mL DBA/THF solution was added, the sample was capped and allowed to react with stirring for 15 minutes.
4. 50 mL of 80/20 THF/PG solution was added.
5. The beaker was placed on the titrator and the titration was started. This procedure was repeated.

Calculations $$\% \, NCO = \frac{(\text{mls Blank} - \text{mls Sample}) \times (\text{Normality HCl}) \times (4.2018)}{\text{Sample weight, g}}$$

$$IEW = \frac{(\text{Sample wt., grams}) \times (1000)}{(\text{mls Blank} - \text{mls Sample}) \times (\text{Normality HCl})}$$

IEW=Isocyanate Equivalent Weight

The SH groups within the product were determined using the following procedure. A sample size (0.1 mg) of the product was combined with 50 mL of tetrahydrofuran (THF)/propylene glycol (80/20) and stirred at room temperature until the sample was substantially dissolved. While stirring, 25.0 mL of 0.1 N iodine solution (which was commercially obtained from Aldrich 31, 8898-1) was added to the mixture and then allowed to react for a time period of from 5 to 10 minutes. To this mixture was added 2.0 mL concentrated HCl. The mixture was then titrated potentiometrically with 0.1 N sodium thiosulfate in the millivolt (mV) mode. A blank value was initially obtained by titrating 25.0 mL iodine (including 1 mL of concentrated hydrochloric acid) with sodium thiosulfate in the same manner as conducted with the product sample.

$$\% \, SH = \frac{(\text{mls Blank} - \text{mls Sample}) \times (\text{Normality } NA_2S_2O_3) \times (3.307)}{\text{Sample weight, g}}$$

Example 1

Synthesis of 2/1 (mol/mol) Adduct of Dimercaptodiethylsulfide (DMDS) and Proparcyl Alcohol (PA)

In a glass jar with magnetic stirrer were mixed Dimercaptodiethylsulfide from Nisso Maruzen, Japan, 154.0 g., 1.0 mol and Propargyl alcohol (PA) from Aldrich, 28.0 g., 0.5 mols at room temperature. Then this mixture was heated up to 60° C. using an oil bath. The mixture was kept at this temperature upon stirring for 30 min. An exothermic reaction started to take place leading to increase in the temperature of the reaction mixture up to 80° C. for a short period of time. This exothermic reaction was over after 30 minutes and the reaction temperature went down to 60° C., the temperature of the heating bath. Radical initiator Vazo 64, 50 mg., 275 ppm was added three times at intervals of 5 hours while the mixture was stirred at 60° C. Then equivalent weight of 181.5 g/equiv (theoretical 182 g/equiv) was measured, based on that Mn=363 was calculated (theoretically expected 364). Vazo 64, 50 mg., 275 ppm was added again and the mixture was heated at 60° C. upon stirring for another 5 hours. The equivalent weight measurement showed no changes and the reaction was considered completed. The viscosity of thus obtained clear water white product was 258 cP (25° C.), nD=1.627, Abbe 36, nE=1.631, Abbe 36.

Example 2

Synthesis of 3/2 (mol/mol) Adduct of Dimercaptodiethylsulfide (DMDS) and Proparcyl Alcohol In a glass jar with magnetic stirrer were mixed DMDS from Nisso Maruzen, Japan, 346.5 g., 2.25 mol and Propargyl alcohol from Aldrich, 84.0 g., 1.5 mols at room temperature. Then this mixture was heated up to 50° C. using an oil bath. The mixture was kept at this temperature upon stirring for 1.5 hours. An exothermic reaction started to take place leading to increase in the temperature of the reaction mixture up to 70° C. for a short period of time, then the temperature went down to 50° C., the temperature of the heating bath. Radical initiator Vazo 52, 120 mg, 275 ppm was added twice at 15 hours interval and the mixture was stirred at 50° C. Then SH equivalent weight was measured, it was 214. Vazo 52, 120 mg., 275 ppm was added again and the mixture was heated at 55° C. upon stirring for another 15 hours. The equivalent weight of 283 g/equiv (theoretical 287 g/equiv) was measured. The viscosity of thus obtained clear water white viscous product was 115 cP (73° C.), nD=1.631, Abbe 38, nE=1.635, Abbe 38.

Example 3

Synthesis of 2/1 (mol/mol) Adduct of Dimercaptodiethylsulfide (DMDS) and Phenyl Acetylene (PHA)

In a glass jar with magnetic stirrer were mixed DMDS from Nisso Maruzen, Japan, 77.0 g., 0.5 mol and Phenyl acetylene from Aldrich, 25.5 g., 0.25 mols at room temperature. Then this mixture was heated up to 70° C. using an oil bath. Vazo 64, 20 mg, 200 ppm was added four times at 15 hours interval and the mixture was stirred at 70° C. Then SH equivalent weight was measured, it was 173 g/equiv. Vazo 64, 20 mg., 200 ppm was added again and the mixture was heated at 70° C. upon stirring for another 15 hours. The SH equivalent weight of 173 g/equiv (theoretical 205 g/equiv) was measured. The product obtained was transparent, yellow viscous liquid, nD=1.635, Abbe 26, nE=1.641, Abbe 26.

Example 4

Synthesis of 2/1 (mol/mol) Adduct of Dimercaptodiethylsulfide (DMDS) and 1,3-Diisopropenyl Benzene (DIPEB)

524.6 g DMDS (3.4 moles) was charged to a glass jar, and the content was heated to 60° C. To the jar was slowly added 269.0 g DIPEB (1.7 moles) with mixing. Once the addition of DIPEB was completed, the jar was placed in an oven heated to 60° C. for 2 hours. Afterwards, 0.1 g VAZO 52 was dissolved into the contents of the jar, and the jar was returned to the oven. After 20 hours, the resulting sample was titrated for —SH equivalents and was found to have an equivalent weight of 145 g/mol. 0.1 g VAZO 52 was dissolved into the reaction mixture, which was then returned to the oven. Over the course of 8 hours, two additions of 0.2 g VAZO 52 were made, and the reaction mixture kept in the 60° C. oven over that time frame. 17 hours after the final addition of VAZO 52 was made, the resulting sample was titrated to an equivalent weight of 238 g/equiv (theoretical 233 g/equivalent). The viscosity of the material at 25° C. was measured and found to be 490 cps. The product obtained was transparent liquid, $n_D$=1.611, Abbe 35, $n_E$=1.615, Abbe 35.

Example 5

Synthesis of 2/1 (mol/mol) Adduct of Dimercaptodiethylsulfide (DMDS) and 5-Vinyl-2-norbornene (VNB), 77 g DMDS (0.5 moles) was charged to a glass jar, and the content was heated to 60° C. To this jar was slowly added 30 g VNB (0.25 moles) with mixing, while keeping the temperature of the mixture ~60° C. After completion of the addition the mixture was heated at 60° C. for another 30 min, then 0.2 g VAZO 67 was dissolved into the contents of the jar, and the jar was heated at 65° C. for 20 hours. The resulting product was analyzed for SH content by titration with Iodine as described previously. SH equivalent weight of 216 g/equiv (theoretical 214 g/equivalent) was found. The viscosity of the material at 25° C. was measured and found to be 460 cps. The product obtained was transparent colorless liquid, $n_D$=1.607, Abbe 39, $n_E$=1.610, Abbe 39. The yield was quantitative.

Example 6

One Pot Synthesis of Oligomeric Polythiol, Adduct of Dimercaptodiethylsulfide (DMDS), 1,3-Diisopropenyl Benzene (DIPEB), and Propargyl Alcohol (PA)

127.6 g DMDS (0.828 moles), 65.5 g DIPEB (0.415 moles) and 6.8 g PA (0.121 moles) were charged to a glass jar. The mixture was stirred at room temperature for 30 min. After that the mixture was heated at 60° C. for another 30 min, then 0.1 g VAZO 67 was dissolved into the contents of the jar, and the jar was heated at 65° C. for 15 hours. Two additional portions of 0.100 g VAZO 67 were added in an interval of 6 hours. The resulting product was analyzed for SH content by titration with Iodine as described previously. SH equivalent weight of 335 g/equiv (theoretical 341 g/equivalent) was found. The viscosity of the material at 73° C. was measured and found to be 150 cps. The product obtained was transparent colorless liquid, $n_D$=1.6152, Abbe 37, $n_E$=1.620, Abbe 36.

Example 7

Synthesis of 2/1 (mol/mol) Adduct of the Product of Example 4 and Propargyl Alcohol5)

The product of Example 4, 200.0 g., 0.42 mol and propargyl alcohol, 11.6 g., 0.21 mol were mixed at room temperature. Then this mixture was heated up to 65° C. Radical initiator Vazo 52, 42 mg, 200 ppm was added three times at intervals of 5 hours while the mixture was stirred at 65° C. Then SH equivalent weight was measured, it was 499 g/equiv. The mixture was heated at 65° C. for another 5 hours and SH equivalent weight was measured again, it was 499 g/equiv, based on that Mn=998 was calculated (theoretically expected 1008). The viscosity of thus obtained clear water white oligomeric mixture was 463 cP (73° C.), nD=1.620, Abbe 36, nE=1.624, Abbe 35.

Example 8

Synthesis of 2/0.32/0.68 (mol/mol/mol) Adduct of the Product of Example 4, Propargyl Alcohol and 5-Vinyl-2-Norbornene (VNB)

The product of Example 4, 238.0 g., 0.5 mol, propargyl alcohol, 4.48 g., 0.08 mol and 5-vinyl-2-norbornene, 20.4 g., 0.17 mol were mixed at room temperature. Then this mixture was heated up to 60° C. until it became homogeneous. Radical initiator Vazo 52, 20 mg, 76 ppm was added three times at intervals of 5 hours while the mixture was stirred at 60° C. Then SH equivalent weight was measured, it was 511 g/equiv, based on that Mn=1022 was calculated (theoretically expected 1051). The equivalent weight did not change after another 5 hours of heating at 60° C. and stirring. The viscosity of thus obtained clear water white oligomeric mixture was 468 cP (73° C.), nD=1.615, Abbe 37, nE=1.619, Abbe 36.

Example 9

Synthesis of 2/0.5/0.5 (mol/mol/mol) Adduct of the Product of Example 4, Propargyl Alcohol and 1,3-Diisopropenyl Benzene (DIPEB)

The product of Example 4, 238.0 g., 0.5 mol, propargyl alcohol, 7.0 g., 0.125 mol and 1,3-Diisopropenyl benzene, 19.75 g, 0.125 mol were mixed at room temperature. Then this mixture was heated up to 65° C. until it became homogeneous. Radical initiator Vazo 52, 20 mg, 76 ppm was added three times at intervals of 5 hours while the mixture was stirred at 65° C. Then SH equivalent weight was measured, it was 510 g/equiv, based on that $M_n$=1020 was calculated (theoretically expected 1059). The equivalent weight did not change after another 5 hours of heating at 60° C. and stirring. The viscosity of thus obtained clear water white oligomeric mixture was 452 cP (73° C.), nD=1.617, Abbe 36, nE=1.621, Abbe 35.

Example 10

Synthesis of Polythiourethane Prepolymer Using the Product of Example 7

4,4-Dicyclohexylmethane diisocyanate (Desmodur W) from Bayer Corp. (135.0 g, 1.03 mole eq.) the product of Example 7 (70.0 g, 0.2102 mole eq.) were mixed and degassed under vacuum for 2.5 hours at room temperature. The mixture was flushed with Nitrogen and heated for 18 hours at a temperature of 120° C. SH group analysis showed complete consumption of SH groups. The heating was terminated. The resulting clear mixture had viscosity (73° C.) of 928 cP, nE of 1.551 (20° C.), Abbe number of 45; and NCO groups of 16.73%.

Example 11

Synthesis of Polythiourethane Prepolymer Using the Product of Example 8

4,4-Dicyclohexylmethane diisocyanate (Desmodur W) from Bayer Corp. (115.4 g, 0.881 mole eq.), isophorone diisocyanate (IPDI) from Bayer Corp. (12.8 g, 0.115 mole eq.) and the product of Example 8 (100.0 g, 0.226 mole eq.) were mixed and degassed under vacuum for 2.5 hours at room temperature. N,N-dimethylcyclohexyl amine (0.06 g, 263 ppm) was added to the mixture. The mixture was flushed with Nitrogen and heated for 5 hour at a temperature of 65° C. SH group analysis after that showed complete consumption of SH groups. The heating was terminated. The resulting clear mixture had viscosity (73° C.) of 1403 cP, nE of 1.561 (20° C.), Abbe number of 43; and NCO groups of 13.36%.

Example 12

Synthesis of Polythiourethane Prepolymer Using the Product of Example 9

4,4-Dicyclohexylmethane diisocyanate (Desmodur W) from Bayer Corp. (126.5 g, 0.965 mole eq.), isophorone diisocyanate (IPDI) from Bayer Corp. (14.1 g, 0.127 mole eq.) and the product of Example 9 (100.0 g, 0.245 mole eq.) were mixed and degassed under vacuum for 2.5 hours at room temperature. N,N-dimethylcyclohexyl amine (0.075 g, 312 ppm) was added to the mixture. The mixture was flushed with Nitrogen and heated for 5 hour at a temperature of 65° C. SH group analysis after that showed complete consumption of SH groups. The heating was terminated. The resulting clear mixture had viscosity (73° C.) of 1320 cP, nE of 1.558 (20° C.), Abbe number of 44; and NCO groups of 14.99%.

Example 13

Chain Extension of the Polythiourethane Prepolymer of Example 10

The product of Example 10 (50 g) was degassed under vacuum at a temperature of 60° C. for four hours. Diethyltoluenediamine (Commercial name is Ethacure 100 from Albemarle Corporation) (DETDA) (9.76 g), the product of Example 4 (19.28 g) and N,N-dimethylcyclohexyl amine (0.030 g) were mixed and degassed under vacuum at a temperature of 60° C. for 2 hours. The two mixtures were then mixed together at the same temperature and charged between a preheated glass plates mold. The material was cured in a preheated oven at a temperature of 110° C. for 72 hours. The cured material was clear and had nE of 1.595 (20° C.) and Abbe number of 38 and Martens Hardness 110.

Example 14

Chain Extension of the Prepolymer of Example 11

The product of Example 11 (40 g) was degassed under vacuum at a temperature of 60° C. for four hours. Diethyltoluenediamine (Commercial name is Ethacure 100 from Albemarle Corporation) (DETDA) (6.79 g) and the product of Example 4 (10.77 g) were mixed and degassed under vacuum at a temperature of 60° C. for 2 hours. The two mixtures were then mixed together at the same temperature and charged between a preheated glass plates mold. The material was cured in a preheated oven at a temperature of 110° C. for 72 hours. The cured material was clear and had nE of 1.596 (20° C.) and Abbe number of 38 and Martens Hardness 84.

Example 15

Chain Extension of the Prepolymer of Example 12

The product of Example 12 (40 g) was degassed under vacuum at a temperature of 60° C. for four hours. Diethyltoluenediamine (Commercial name is Ethacure 100 from Albemarle Corporation) (DETDA) (7.63 g) and the product of Example 4 (12.04 g) were mixed and degassed under vacuum at a temperature of 60° C. for 2 hours. The two mixtures were then mixed together at the same temperature and charged between a preheated glass plates mold. The material was cured in a preheated oven at a temperature of 120° C. for 24 hours. The cured material was clear and had nE of 1.596 (20° C.) and Abbe number of 38 and Martens Hardness 97.

Example 16

One Pot Synthesis of Polyurethane Polymer Using the Product of Example 1

The product of Example 1 (27.8 g) was degassed under vacuum at a temperature of 60° C. for four hours. 4,4-dicyclohexylmethane diisocyanate (Desmodur W) from Bayer (30.0 g) and N,N-dimethylcyclohexyl amine (0.020 g) were mixed well, then the mixture was degassed under vacuum at a temperature of 60° C. for 2 hours. The two mixtures were then mixed together at the same temperature and charged between a preheated glass plates mold. The material was cured in a preheated oven at a temperature of 125° C. for 24 hours. The cured material was clear and had refractive index (e-line) of 1.595 (20° C.) and Abbe number of 41 and Martens hardness 109.

Example 17

One Pot Synthesis of Polyurethane/Urea Polymer Using the Product of Example 2

Diethyltoluenediamine from Albemarle Corporation (DETDA) (1.7 g) and the product of Example 2 (24.6 g) were mixed and degassed under vacuum at a temperature of 75° C. for four hours. 4,4-dicyclohexylmethane diisocyanate (Desmodur W) from Bayer (25.0 g) and N,N-dimethylcyclohexyl amine (0.020 g) were mixed well, then the mixture was degassed under vacuum at a temperature of 60° C. for 2 hours. The two mixtures were then mixed together and charged between a preheated glass plates mold. The material was cured in a preheated oven at a temperature of 120° C. for 48 hours. The cured material was clear and had nE of 1.593 (20° C.) and Abbe number of 40 and Martens Hardness 112.

Example 18

One Pot Synthesis of Polyurethane Polymer Using the Product of Example 1

The product of Example 1 (29.7 g) was degassed under vacuum at a temperature of 75° C. for four hours. 4,4-dicyclohexylmethane diisocyanate (Desmodur W) from Bayer (30.0 g), 1,3-bis(1-isocyanato-1-methylethyl)-benzene) from Cytec Industries Inc (TMXDI) (3.02 g) and N,N-dimethylcyclohexyl amine (0.020 g) were mixed well, then the mixture was degassed under vacuum at a temperature of 60° C. for 2 hours. The two mixtures were then mixed together and charged between a preheated glass plates mold. The material was cured in a preheated oven at a temperature of 125° C. for 48 hours. The cured material was clear, yellowish and had nE of 1.596 (20° C.) and Abbe number of 41 and Martens hardness 123.

Example 19

One Pot Synthesis of Polyurethane Polymer Using the Product of Example 1

The product of Example 1 (22.90 g) was degassed under vacuum at a temperature of 75° C. for four hours. Isophorone diisocyanate (IPDI) from Bayer (21.18 g) and N,N-dimethylcyclohexyl amine (0.020 g) were mixed well, then the mixture was degassed under vacuum at a temperature of 60° C. for 2 hours. The two mixtures were then mixed together and charged between a preheated glass plates mold. The material was cured in a preheated oven at a temperature of 125° C. for 24 hours. The cured material was clear and had nE of 1.595 (20° C.) and Abbe number of 40 and Martens Hardness 141.

Example 20

One Pot Synthesis of Polyurethane Polymer Using the Product of Example 1

The product of Example 1 (30.95 g) was degassed under vacuum at a temperature of 75° C. for four hours. Isophorone diisocyanate (IPDI) from Bayer (15.00 g), 4,4-dicyclohexylmethane diisocyanate (Desmodur W) from Bayer (15.0 g) and N,N-dimethylcyclohexyl amine (0.020 g) were mixed well, then the mixture was degassed under vacuum at a temperature of 60° C. for 2 hours. The two mixtures were then mixed together and charged between a preheated glass plates mold. The material was cured in a preheated oven at a temperature of 125° C. for 24 hours. The cured material was clear and had nE of 1.595 (20° C.) and Abbe number of 40 and Martens hardness 127.

Example 21

One Pot Synthesis of Polyurethane/Urea Polymer Using the Product of Examples 2 and 4

The product of Example 2 (9.75 g) was mixed with the product of Example 4 (19.0 g) and diethyltoluenediamine from Albemarle Corporation (DETDA) (7.92 g). The mixture was degassed under vacuum at a temperature of 75° C. for four hours. 4,4-dicyclohexylmethane diisocyanate (Desmodur W) from Bayer (30.0 g) and N,N-dimethylcyclohexyl amine (0.020 g) were mixed well, then the mixture was degassed under vacuum at a temperature of 60° C. for 2 hours. The two mixtures were then mixed together and charged between a preheated glass plates mold. The material was cured in a preheated oven at a temperature of 125° C. for 24 hours. The cured material was clear and had nE of 1.592 (20° C.) and Abbe number of 39 and Martens Hardness 125.

Example 22

One Pot Synthesis of Polyurethane/Urea Polymer Using the Product of Example 6

The product of Example 6 (36.7 g) was degassed under vacuum at a temperature of 60° C. for four hours. 4,4-Dicyclohexylmethane diisocyanate (Desmodur W) from Bayer (33.3 g) and N,N-dimethylcyclohexyl amine (0.020 g) were mixed well, then the mixture was degassed under vacuum at a temperature of 60° C. for two hours. Diethyltoluenediamine from Albemarle Corporation (DETDA) (9.73 g) was degassed under vacuum at room temperature for two hours. The three mixtures were then mixed together and charged between a preheated glass plates mold. The material was cured in a preheated oven at a temperature of 110° C. for 24 hours. The cured material was clear and had nE of 1.595 (20° C.) and Abbe number of 38 and Martens hardness 109.

Example 23

One Pot Synthesis of Polyurethane/Urea Polymer Based on the Product Described in Example 4 Example 7 DETDA and Desmodur W The components listed in Table 1 were used in the amounts indicated to prepare polymeric sheets having a thickness of 3.5 mm for which test results are reported in Table 2. The polymeric sheets were prepared using a mixture of 3 components injected into a specially designed molding machine from Max Machinery. The first component was Desmodur W. The second component was combination of the catalyst, N,N-dimethylcyclohexyl amine with products of Example 4 and Example 7. The first component was degassed under vacuum at room temperature for 16 hours. The second component was degassed under vacuum at 44° C. for 16 hours prior to use. The third component was DETDA obtained from Albemarle Corporation, this component was degassed under vacuum at room temperature for 16 hours prior to use. The molding machine was a Urethane Processor Model No. 601-000-232, which was obtained from Max Machinery in Healdsburg, Calif., USA. The blended mixture was then injected into a preheated glass plate mold that was treated with an external mold release agent. The molds were placed in a convection oven for 24 hours at a temperature of 110° C. Afterwards, the temperature was ramped down to 85° C. before demolding. The resulting sheets were cut into sizes appropriate for the testing described hereinbefore and reported in Table 2.

TABLE 1

| Example # | EX. 4 (Equiv) | EX. 7 (Equiv) | Catalyst (ppm) | Desmodur W (equiv) | DETDA (Equiv) |
| --- | --- | --- | --- | --- | --- |
| 23 | 0.25 | 0.27 | 300 | 1 | 0.43 |

TABLE 2

| Example # | Martens Hardness N/mm$^2$ | nE (20° C.) | Abbe | Density Gram/cm$^3$ |
| --- | --- | --- | --- | --- |
| 23 | 112 | 1.5957 | 37.6 | 1.17 |

Examples 24A-O

Polyurethane and Polyureaurethane Formulations Based on Products Described in Examples 1 and 5 DMDS, DETDA and Desmodur W The components listed in Table 3 were used in the amounts indicated to prepare polymeric sheets having a thickness of 3.5 mm for which test results are reported in Table 4. The polymeric sheets were prepared using a mixture of 3 components injected into a specially designed molding machine from Max Machinery described in Example 23. The first component was Desmodur W. The second component was combination of the catalyst, N,N-dimethylcyclohexyl amine with dithiols of Examples 1, 5 and/or DMDS. Each of these components was degassed under vacuum at 50° C. for 16 hours prior to use. The third component was DETDA obtained from Albemarle Corporation, this component was degassed under vacuum at room temperature for 16 hours prior to use. The blended mixture was then injected into a preheated glass plate mold that was treated with an external mold release agent. The molds were placed in a convection oven for 24 hours at a temperature of 110° C. Afterwards, the temperature was ramped down to 85° C. before demolding. The resulting sheets were cut into sizes appropriate for the testing described hereinbefore and reported in Table 4.

TABLE 3

| Example # | DMDS (Equiv) | EX. 1 (Equiv) | EX. 5 (Equiv) | Catalyst (ppm) | Desmodur W (equiv) | DETDA (Equiv) |
|---|---|---|---|---|---|---|
| 23A | 0 | 1.00 | 0 | 300 | 1 | 0 |
| 23B | 0 | 0.70 | 0.30 | 300 | 1 | 0 |
| 23C | 0 | 0.40 | 0.30 | 300 | 1 | 0.30 |
| 23D | 0.40 | 0.40 | 0 | 300 | 1 | 0.20 |
| 23E | 0.40 | 0.40 | 0.20 | 300 | 1 | 0 |
| 23F | 0 | 0.70 | 0 | 300 | 1 | 0.30 |
| 23G | 0.20 | 0.56 | 0.12 | 300 | 1 | 0.12 |
| 23H | 0.18 | 0.40 | 0.30 | 300 | 1 | 0.12 |
| 23I | 0.21 | 0.40 | 0.09 | 300 | 1 | 0.30 |
| 23J | 0.30 | 0.40 | 0.30 | 300 | 1 | 0 |
| 23K | 0.30 | 0.40 | 0 | 300 | 1 | 0.30 |
| 23L | 0 | 0.40 | 0.30 | 300 | 1 | 0.30 |
| 23M | 0 | 0.70 | 0 | 300 | 1 | 0.30 |
| 23N | 0 | 0.70 | 0.30 | 300 | 1 | 0 |
| 23O | 0.40 | 0.60 | 0 | 300 | 1 | 0 |

TABLE 4

| Example # | Martens Hardness N/mm$^2$ | nE (20° C.) | Abbe | Density Gram/cm$^3$ |
|---|---|---|---|---|
| 23A | 106 | 1.5988 | 41.6 | 1.23 |
| 23B | 105 | 1.6008 | 41.1. | 1.22 |
| 23C | 124 | 1.5902 | 40.8 | 1.19 |
| 23D | 121 | 1.5868 | 40.6 | 1.20 |
| 23E | 108 | 1.5987 | 40.7 | 1.22 |
| 23F | 122 | 1.5859 | 40.8 | 1.19 |
| 23G | 115 | 1.5943 | 40.5 | 1.21 |
| 23H | 116 | 1.5957 | 40.7 | 1.21 |
| 23I | 123 | 1.5843 | 40.4 | 1.19 |
| 23J | 107 | 1.5991 | 40.6 | 1.22 |
| 23K | 124 | 1.5826 | 40.4 | 1.18 |
| 23L | 123 | 1.5899 | 40.7 | 1.19 |
| 23M | 123 | 1.5849 | 40.7 | 1.19 |
| 23N | 106 | 1.5977 | 41.4 | 1.22 |
| 23O | 109 | 1.5956 | 41.2 | 1.23 |

Whereas particular embodiments of this invention have been described above for purposes of illustration, it will be evident to those skilled in the art that numerous variations of the details of the present invention may be made without departing from the invention as defined in the appended claims.

What is claimed is:

1. A thioether-functional, oligomeric polythiol having pendant hydroxyl functional groups, prepared by reacting together:
   (a) a compound having at least two thiol functional groups; and
   (b) a hydroxyl functional compound having triple bond functionality.

2. The oligomeric polythiol of claim 1 wherein the compound (a) having at least two thiol functional groups comprises a dithiol, a compound having more than two thiol functional groups, or a mixture of a dithiol and a compound having more than two thiol functional groups.

3. The oligomeric polythiol of claim 2 wherein the compound (a) comprises a mixture of a dithiol and a compound having more than two thiol functional groups, wherein the compound having more than two thiol functional groups is present in an amount up to 10 percent by weight of the mixture.

4. The oligomeric polythiol of claim 1 wherein the compound (a) having at least two thiol functional groups further contains hydroxyl functionality.

5. The oligomeric polythiol of claim 1 wherein the thiol functional groups in compound (a) are terminal groups.

6. The oligomeric polythiol of claim 1 wherein the ratio of thiol functional groups to triple bonds is from 1.01:1 to 5.0:1.

7. The oligomeric polythiol of claim 1 wherein the compound (b) having triple bond functionality comprises propargyl alcohol, 2-butyne-1,4-diol, 3-butyne-2-ol, and/or 3-hexyne-2,5-diol.

8. The oligomeric polythiol of claim 1 wherein at least a portion of hydroxyl functional groups on the compound (b) are esterified.

9. A rigid optical article comprising a reaction product of:
   (A) a reactive compound comprising a material having functional groups that are reactive with active hydrogen groups;
   (B) a thioether-functional, oligomeric polythiol having pendant hydroxyl functional groups, prepared by reacting together:
      (1) a compound having at least two thiol functional groups; and
      (2) a hydroxyl functional compound having triple bond functionality; and optionally
   (C) a compound different from (B) containing active hydrogens.

10. The optical article of claim 9, wherein the reactive compound (A) comprises a polyisocyanate, a blocked polyisocyanate, a polyisothiocyanate, a polyepoxide, a polyepisulfide, a polyacid, an anhydride, a polyanhydride, and/or a polyethylenically unsaturated material.

11. The optical article of claim 9, wherein said optical article possesses at least one light influencing property.

12. The optical article of claim 11, wherein said optical article is photochromic.

13. The optical article of claim 9, wherein the compound (C) is present and comprises a compound having at least two active hydrogen-containing groups comprising primary amine groups, secondary amine groups, hydroxyl groups, and/or thiol groups.

14. The optical article of claim 10, wherein the reaction product is prepared in the presence of a urethanation catalyst selected from the group consisting of Lewis bases, Lewis acids, insertion catalysts, stannous octoate, dibutyl tin dilaurate, dibutyl tin diacetate, dibutyl tin mercaptide, dibutyl tin dimaleate, dimethyl tin diacetate, dimethyl tin dilaurate, dibutyltin dichloride, 1,4-diazabicyclo [2.2.2] octane, zinc octoate, bismuth, ferric acetylacetonate, phosphines, tertiary ammonium salts, tertiary amines, and mixtures thereof.

* * * * *